(«12») United States Patent
Kikuchi

(10) Patent No.: US 10,250,333 B2
(45) Date of Patent: Apr. 2, 2019

(54) OPTICAL COMMUNICATION SYSTEM AND OPTICAL TRANSMITTER

(71) Applicant: Oclaro Japan, Inc., Sagamihara, Kanagawa (JP)

(72) Inventor: Nobuhiko Kikuchi, Tokyo (JP)

(73) Assignee: Oclaro Japan, Inc., Kanagawa (JP)

( * ) Notice: Subject to any disclaimer, the term of this patent is extended or adjusted under 35 U.S.C. 154(b) by 0 days.

(21) Appl. No.: 16/161,389

(22) Filed: Oct. 16, 2018

(65) Prior Publication Data

US 2019/0052366 A1    Feb. 14, 2019

Related U.S. Application Data

(62) Division of application No. 15/443,329, filed on Feb. 27, 2017.

(30) Foreign Application Priority Data

Feb. 29, 2016  (JP) ................................ 2016-038256

(51) Int. Cl.
*H04B 10/54* (2013.01)
*H04J 14/02* (2006.01)
(Continued)

(52) U.S. Cl.
CPC ......... *H04B 10/54* (2013.01); *H04B 10/2507* (2013.01); *H04B 10/2513* (2013.01);
(Continued)

(58) Field of Classification Search
CPC ...... H04B 10/54; H04B 10/2513; H04J 14/02
See application file for complete search history.

(56) References Cited

U.S. PATENT DOCUMENTS 6,850,713 B2 * 2/2005 Kikuchi ............... H04B 10/505
359/237
7,116,917 B2 * 10/2006 Miyamoto ......... H04B 10/5051
398/185

(Continued)

OTHER PUBLICATIONS

K. I. Amila Sampath, et al., "PAPR Reduction Technique for Optical SSB Modulation using Peak Folding", The 20th OptoElectronics and Communications Conference (OECC 2015), JTuA.35, in Shanghai, China, from Jun. 28 to Jul. 2, 2015.

(Continued)

*Primary Examiner* — Mina M Shalaby
(74) *Attorney, Agent, or Firm* — Mattingly & Malur, PC

(57) ABSTRACT

Provided is an optical communication system capable of suppressing the deterioration of an intensity waveform of an optical intensity modulated signal subjected to transformation using SSB modulation and improving a bit error ratio and a receiver sensitivity of the optical intensity modulated signal. The optical communication system includes: an optical transmitter section including: a single-side band modulation circuit configured to subject a double-side band modulated signal to generate a single-side band modulated signal; a correction circuit configured to correct an intensity of the single-side band modulated signal so that the intensity of the single-side band modulated signal becomes closer to an intensity of the double-side band modulated signal; and an optical IQ modulator configured to output an optical modulated signal; and an optical receiver section configured to receive the optical modulated signal to directly detect an intensity component of the optical modulated signal.

3 Claims, 24 Drawing Sheets

(51) Int. Cl.
*H04B 10/2513* (2013.01)
*H04B 10/61* (2013.01)
*H04B 10/516* (2013.01)
*H04B 10/2507* (2013.01)

(52) U.S. Cl.
CPC ......... *H04B 10/5165* (2013.01); *H04B 10/61* (2013.01); *H04J 14/02* (2013.01)

(56) References Cited

U.S. PATENT DOCUMENTS

| | | | | |
|---|---|---|---|---|
| 2004/0208436 | A1* | 10/2004 | Hakimi | G02B 6/12004 385/27 |
| 2006/0126149 | A1* | 6/2006 | Sellars | G11C 13/044 359/237 |
| 2009/0238580 | A1* | 9/2009 | Kikuchi | H04B 10/25137 398/192 |
| 2010/0220376 | A1* | 9/2010 | Kobayashi | G02F 1/0327 359/238 |
| 2012/0134676 | A1* | 5/2012 | Kikuchi | H04B 10/532 398/65 |
| 2012/0155887 | A1* | 6/2012 | Youn | H04B 10/0775 398/182 |
| 2015/0280830 | A1* | 10/2015 | Hwang | H04B 10/5165 398/147 |
| 2017/0264368 | A1* | 9/2017 | Eiselt | H04B 10/516 |

OTHER PUBLICATIONS

R. Hirai, et al., "Proposal of new 400GbE signaling formats with 4λ x 100G configuration", IEEE 802.3 400GE Study Group, IEEE 802 Jan. 2014 Interim.

* cited by examiner

ER=7dB, C=0

ER=4.2dB, C=0

ER=4.2dB, C=1.8

BIT ERROR RATE
CHARACTERISTIC

OPTICAL SPECTRUM

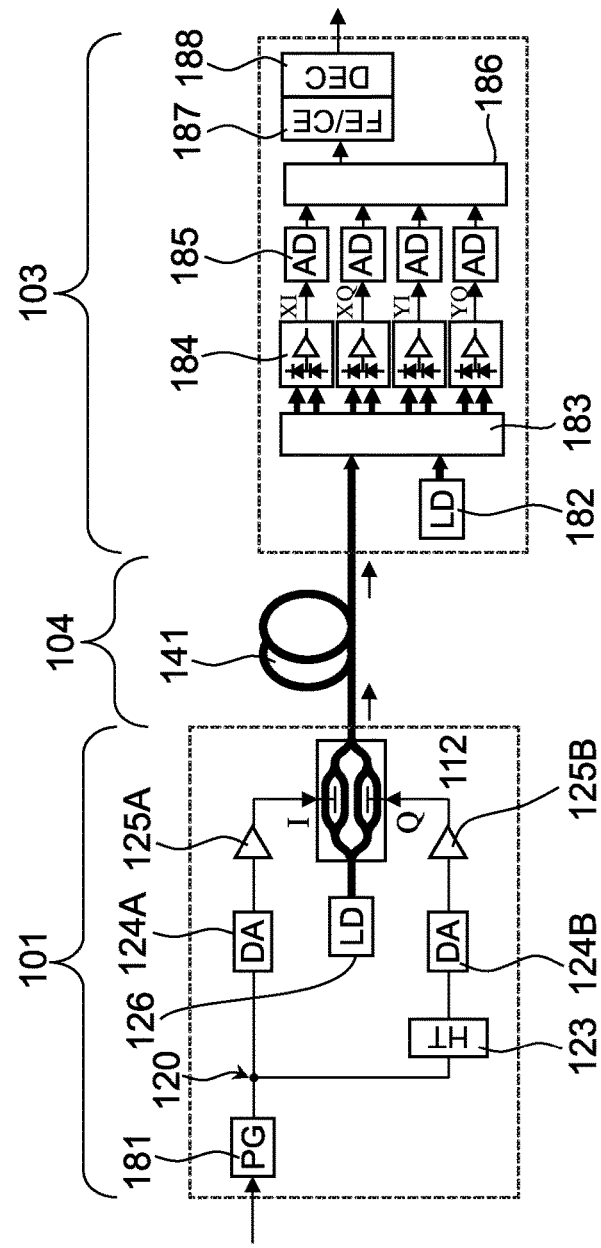

OPTICAL COMMUNICATION SYSTEM AND OPTICAL TRANSMITTER

CROSS-REFERENCE TO RELATED APPLICATION

The present application claims priority from Japanese application JP 2016-038256, filed on Feb. 29, 2016, the content of which is hereby incorporated by reference into this application.

BACKGROUND OF THE INVENTION

1. Field of the Invention

The present invention relates to an optical communication technology, and more particularly, to an optical communication system suitable for transmission of an optical signal and an optical transmitter used for the optical communication system.

2. Description of the Related Art

In an optical communication technology, there are increasing demands for further cost reduction, simplification, downsizing, and lower power consumption of an optical transmitter and an optical receiver in addition to a speedup of optical communications. In order to meet such demands, an optical communication system using intensity modulation/direct detection (IM/DD) with a simplified configuration is suitable. The intensity modulation/direct detection is a simple modulation/demodulation scheme for an optical signal. In the intensity modulation/direct detection, only the intensity of an optical signal is modulated at a transmitting end, while at a receiving end, an optical intensity of the optical signal received through use of a photodetector, for example, a photodiode, is converted into an electronic signal as it is and subjected to decoding processing. For example, the intensity modulation/direct detection is used for a short distance optical transmission.

SUMMARY OF THE INVENTION

However, in the intensity modulation/direct detection, an optical frequency bandwidth occupied by the optical signal is generally wide. Therefore, there is a problem in that dense wavelength division multiplexing is difficult due to low frequency utilization efficiency, which imposes a limitation on transmission capacity. When a modulation speed (baud rate) of the optical signal is represented by R and an optical frequency bandwidth is represented by B, the optical frequency bandwidth of an optical intensity modulated signal ranges, for example, B~4R in the case of binary intensity modulation and B~2R in the case of 4-level pulse amplitude modulation (PAM4), which exhibit relatively large values.

As a technology for compressing the band of an optical signal, there is known optical single-side band (SSB) modulation for conducting signal transmission by extracting only a single-side (one-side) band of the optical signal at the transmitting end. The optical SSB modulation is a technology applied to a one-dimensional modulated signal, for example, an optical amplitude modulation or an optical phase modulation in principle, and a coherent optical receiver configured to extract only an amplitude component or a phase component of the received signal is used at the receiving end. An example of the optical SSB modulation is disclosed in K. I. Amila Sampath and K. Takano, "PAPR Reduction Technique for Optical SSB Modulation using Peak Folding", The 20th OptoElectronics and Communications Conference (OECC 2015), JTuA.35, in Shanghai, China, from Jun. 28 to Jul. 2, 2015.

FIG. 15 is a schematic diagram for illustrating a configuration of the optical communication system according to the related art. The optical communication system includes an optical transmitter section 101, an optical receiver section 103, and an optical transmission section 104.

FIG. 16 is graphs for showing a principle of SSB modulation. FIG. 16($a$) is the graph for showing a spectrum of an electronic amplitude modulated signal being a real-part signal. The horizontal axis represents a frequency, and the vertical axis represents an intensity. The electronic amplitude modulated signal is a two-side spectrum (double-side band (DSB)) signal exhibiting symmetry with respect to a frequency (=0) of a center carrier between the positive side and the negative side on the frequency axis. The maximum value of the frequency is +R, and the minimum value is −R. FIG. 16($b$) is the graph for showing a frequency characteristic (transmission intensity) of a transformation using SSB modulation U(f), and the vertical axis represents a transmittance. U(f) has a characteristic of extracting only a positive part on the frequency axis, and is represented as U(f)=1+ j*H(f). In this case, j represents an imaginary unit, and H(f) represents a Hilbert transformation. The transformation using SSB modulation has a real part of 1 and an imaginary part of the Hilbert transformation even in the time domain. An output signal of the transformation using SSB modulation is a complex signal. FIG. 16($c$) is the graph for showing a spectrum of the electronic amplitude modulated signal transformed using SSB modulation (SSB modulated signal). Only a one-side spectrum is extracted by the transformation using SSB modulation.

The optical transmitter section 101 includes an optical in-phase/quadrature (IQ) modulator 112, a branch point 120, a Hilbert transformer 123, two digital-to-analog converters (DA converters) 124A and 124B, two driver amplifiers 125A and 125B, a transmission laser source 126, and a binary code generator 181. An information signal input from the outside is input to the binary code generator 181 to be converted into a binary digital signal. The binary digital signal is divided into two signals on an output side of the binary code generator 181. The output binary digital signal is divided into two signals at the branch point 120. One signal is changed to an analog signal by the DA converter 124A, amplified by the driver amplifier 125A, and input to a modulation terminal I of the optical IQ modulator 112. The other signal is input to the Hilbert transformer 123, and transformed using SSB modulation by the Hilbert transformer 123. The output signal from the Hilbert transformer 123 is changed to an analog signal by the DA converter 124B, amplified by the driver amplifier 125B, and input to a modulation terminal Q of the optical IQ modulator 112. Non-modulated light having a fixed intensity output by the transmission laser source 126 is input to the optical IQ modulator 112, and the optical IQ modulator 112 generates an optical binary amplitude modulated signal based on the modulated signals input to the modulation terminals I and Q.

FIG. 17 is graphs for showing waveforms of an optical SSB modulated signal. FIG. 17($a$) is the graph for showing a time waveform of a real-part signal within the optical SSB modulated signal, and the vertical axis represents the real-part signal, and corresponds to a real-part signal I=x(t) applied to the modulation terminal I. The horizontal axis represents a time t. In this case, optical binary amplitude modulation is achieved by modulating the signal so that the space within a binary code with mark/space falls near the above-mentioned zero point. FIG. 17(b) is the graph for showing a time waveform of an imaginary-part signal within the optical SSB modulated signal, and corresponds to an imaginary-part signal Q=H (x(t)) subjected to the Hilbert transformation. The horizontal axis represents the time t. The time waveform of the imaginary-part signal is a pulse-shaped time waveform close to differential of the real-part signal.

FIGS. 18A(a) and 18A(b) are graphs for showing spectrums of an optical amplitude modulated signal, FIGS. 18B(a) and 18B(b) are graphs for showing a signal point constellation of the optical amplitude modulated signal, and FIGS. 18C(a) and 18C(b) are graphs for showing a received power waveform of the optical amplitude modulated signal. In each of these figures, part (a) indicates a characteristic of a normal optical amplitude modulated signal, and part (b) indicates a characteristic of an optical amplitude SSB modulated signal and the characteristics shown in these figures are each calculated by a numerical simulation.

The optical amplitude modulated signal (optical binary amplitude modulated light) shown in FIG. 18A(a) has a frequency spectrum (fc−R to fc+R) that is symmetric with respect to a frequency fc of the laser light between the positive side and the negative side. Its complex optical electric field has only the amplitude of the real part subjected to binary modulation, and as shown in 18B(a), forms a trace indicating a movement between two points of 0 and 1 on a real axis (I axis) in a complex plane. As shown in shown in FIG. 18C(a), the received power waveform obtained by directly detecting the optical binary amplitude modulated signal exhibits a received power waveform clearly split into binary parts at a center time tc.

In contrast, the optical amplitude SSB modulated signal shown in FIG. 18A(b) corresponds to the optical SSB modulated signal output from the optical IQ modulator 112 of FIG. 15, and its frequency spectrum is SSB modulated so as to leave only the positive half with respect to the frequency fc. As shown in FIG. 18B(b), its complex optical electric field is greatly widened along an imaginary axis (Q axis) direction due to the added Q components. Therefore, as shown in FIG. 18C(b), the received power waveform obtained by directly detecting the optical binary amplitude SSB modulated signal causes a distortion over the entire waveform, and a bit error ratio of the received signal greatly deteriorates. When the optical SSB modulation is applied to optical intensity modulation/direct detection, transmission performance greatly deteriorates, which is not suitable for practical use.

As illustrated in FIG. 15, the optical SSB modulated signal output by the optical transmitter section 101 is transmitted on an optical fiber transmission line 141 of the optical transmission section 104, and then received by the optical receiver section 103. The optical receiver section 103 is a related-art digital coherent optical receiver. The digital coherent optical receiver is an optical receiver used for long distance transmission having a transmission distance of, for example, from several hundred kilometers to several thousand kilometers. The digital coherent optical receiver can detect an amplitude and a phase of an optical signal.

The optical receiver section 103 includes a local-oscillator laser source 182, a polarization demultiplexing 90° optical hybrid 183, four balanced PD modules 184, four AD converters 185, a polarization demultiplexing butterfly filter 186, a frequency/phase estimation circuit 187, and a binary decision circuit 188. The received light (SSB modulated optical signal) received from the optical transmission section 104 by the optical receiver section 103 is multiplexed with local oscillation light emitted from the local-oscillator laser source 182 by the polarization demultiplexing 90° optical hybrid 183. Then, the multiplexed light is demultiplexed into four signals, which are respectively input to the four balanced PD modules 184 to be converted into electronic signals. A real-part component (XI) and an imaginary-part component (XQ) of an X-polarized component of the received light and a real-part component (YI) and an imaginary-part component (YQ) of a Y-polarized component of the received light are respectively converted into the electronic signals, output from the four balanced PD modules 184, and input to the four AD converters 185. Those electronic signals are converted into digital signals by the four AD converters 185, and input to the polarization demultiplexing butterfly filter 186. The polarization demultiplexing butterfly filter 186 adaptively subjects the input signals to polarization separation and equalization. An output signal from the polarization demultiplexing butterfly filter 186 is input to the frequency/phase estimation circuit 187. An output signal from the frequency/phase estimation circuit 187 is input to the binary decision circuit 188 to be decoded. The output signal (transmission light electric field) from the frequency/phase estimation circuit 187 exhibits a wide spread along the imaginary axis (Q axis) direction as shown in FIG. 18B(b), but the binary decision circuit 188 conducts binary decision from a real-axis (I-axis) component of the output signal, and therefore can restore its original information signal.

However, the optical communication system according to the related art illustrated in FIG. 15 is complicated in the modulation and demodulation of a signal, in particular, complicated in the configuration of the optical receiver section 103, and thus leads to increases in the cost, the size, and the power consumption of the optical communication system.

In optical binary intensity modulation/direct detection and multicarrier intensity modulation/direct detection, a large number of experiments involving SSB modulation have been reported. In one of their examples, the SSB modulation is approximately conducted by using a finite impulse response (FIR) filter having four taps as a Hilbert transformer. However, due to the small number of taps of the FIR filter, the cut-off characteristic sufficiently close to a rectangular shape cannot be obtained, and a side-band suppression ratio required for high density wavelength multiplex transmission cannot be obtained. For example, at the point of a transmission distance of 0 km, the optical communication system deteriorates in receiver sensitivity to such a large extent as about 3 dB due to the SSB modulation.

As described above, when the Hilbert transformation is approximated by a low-order filter, the deterioration in receiver sensitivity can be suppressed to a certain extent, but it is difficult to increase the side-band suppression ratio. Meanwhile, when a high-order filter is used to improve approximation accuracy of the Hilbert transformation, the side-band suppression ratio can be improved, but the intensity of an imaginary-part component given by the Hilbert transformation can no longer be ignored, which causes a large waveform distortion.

Also in other prior arts, such limitations that the receiver sensitivity greatly deteriorates and that a sufficient side-band suppression ratio (~20 dB) required for wavelength multiplex transmission cannot be obtained are generally observed in the transmission of an optical SSB modulated signal through use of the optical intensity modulation/direct detection. Those limitations make it difficult to generate an SSB modulated signal having practical performance through use of an optical transmitter and an optical receiver having simplified configurations to which the optical intensity modulation/direct detection is applied.

The present invention has been made in view of the above-mentioned problems, and has an object to provide an optical communication system capable of suppressing the deterioration of an intensity waveform of an optical intensity modulated signal subjected to transformation using SSB modulation and improving a bit error ratio and a receiver sensitivity of the optical intensity modulated signal, and an optical transmitter used for the optical communication system.

(1) In order to solve the above-mentioned problems, an optical communication system according to one embodiment of the present invention includes: an optical transmitter section including: a single-side band modulation circuit configured to subject a double-side band modulated signal to transformation using single-side band modulation to generate a single-side band modulated signal; a correction circuit configured to correct an intensity of the single-side band modulated signal so that the intensity of the single-side band modulated signal becomes closer to an intensity of the double-side band modulated signal; and an optical modulator configured to output an optical modulated signal based on a modulated signal subjected to the correction by the correction circuit; and an optical receiver section configured to receive the optical modulated signal output by the optical transmitter section, and to directly detect an intensity component of the optical modulated signal.

(2) In the optical communication system according to Item (1), the correction circuit may be configured to subtract an intensity of an imaginary-part component of the single-side band modulated signal multiplied by a fixed constant from an intensity of a real-part component of the single-side band modulated signal.

(3) In the optical communication system according to Item (1) or (2): the optical modulator may be an optical IQ modulator; the optical IQ modulator may include a modulation terminal I and a modulation terminal Q; and a real-part intensity signal of the modulated signal subjected to the correction may be input to the modulation terminal I.

(4) In the optical communication system according to any one of Items (1) to (3), the single-side band modulation circuit may include a Nyquist filter having a Nyquist transmission characteristic.

(5) The optical communication system according to any one of Items (1) to (4) may further include an optical fiber transmission line arranged between the optical transmitter section and the optical receiver section, and the optical transmitter section may further include a chromatic dispersion compensator, which is arranged between the correction circuit and the optical modulator, and is configured to apply a transfer function reverse to chromatic dispersion of the optical fiber transmission line.

(6) In the optical communication system according to any one of Items (1) to (5): the optical transmitter section may further include another correction circuit arranged between the correction circuit and the optical modulator; and the another correction circuit may be configured to: subject a first modulated signal output by the correction circuit to the transformation using single-side band modulation to generate a second modulated signal; and correct an intensity of the second modulated signal so that the intensity of the second modulated signal becomes much closer to the intensity of the double-side band modulated signal.

(7) An optical communication system according to one embodiment of the present invention may include: an optical transmitter section including: a single-side band modulation circuit configured to subject a double-side band modulated signal to transformation using single-side band modulation to generate a single-side band modulated signal; and an optical modulator configured to output an optical modulated signal based on the single-side band modulated signal generated by the single-side band modulation circuit; and an optical receiver section configured to receive the optical modulated signal output by the optical transmitter section, and to directly detect an intensity of the optical modulated signal to generate a received signal, and the optical receiver section may include a compensation circuit configured to compensate an intensity of the received signal so that the intensity of the received signal becomes closer to an intensity of the double-side band modulated signal.

(8) The optical communication system according to any one of Items (1) to (7) may further include: a plurality of the optical transmitter sections configured to output optical modulated signals having mutually different frequencies; an optical multiplexer configured to multiplex the optical modulated signals respectively output by the plurality of the optical transmitter sections, and to output a wavelength multiplex optical modulated signal; an optical demultiplexer configured to receive the wavelength multiplex optical modulated signal output by the optical multiplexer, and to demultiplex the wavelength multiplex optical modulated signal into a plurality of the optical modulated signals for the respective frequencies of the optical modulated signals respectively output by the plurality of the optical transmitter sections; and a plurality of optical receiver sections configured to respectively receive input of the plurality of the optical modulated signals output by the optical demultiplexer.

(9) In the optical communication system according to any one of Items (1) to (8), the optical modulated signal may be an optical signal subjected to optical multi-level baseband intensity modulation.

(10) An optical transmitter according to one embodiment of the present invention may include: a single-side band modulation circuit configured to subject a double-side band modulated signal to transformation using single-side band modulation to generate a single-side band modulated signal; a correction circuit configured to correct an intensity of the single-side band modulated signal so that the intensity of the single-side band modulated signal becomes closer to an intensity of the double-side band modulated signal; and an optical modulator configured to output an optical modulated signal based on a modulated signal subjected to the correction by the correction circuit.

According to the present invention, there are provided the optical communication system capable of suppressing the deterioration of the intensity waveform of the optical intensity modulated signal subjected to the transformation using SSB modulation and improving the bit error ratio and the receiver sensitivity of the optical intensity modulated signal, and the optical transmitter used for the optical communication system.

BRIEF DESCRIPTION OF THE DRAWINGS

FIG. 15 is a schematic diagram for illustrating a configuration of an optical communication system according to the related art.

DETAILED DESCRIPTION OF THE INVENTION

Figure 1:
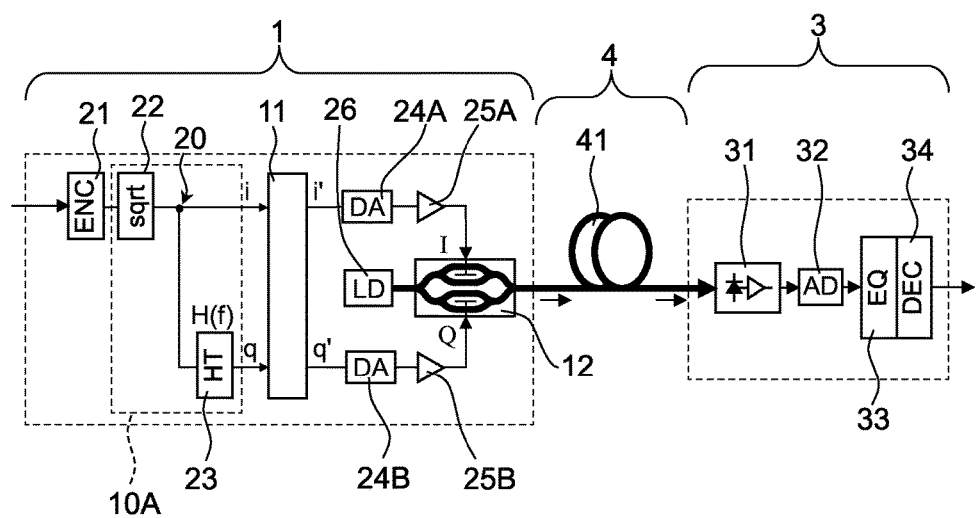
FIG. 1 is a schematic diagram for illustrating a configuration of an optical communication system according to a first embodiment of the present invention.

Embodiments of the present invention are specifically described in detail in the following with reference to the attached drawings. Throughout the figures for illustrating the embodiments, like reference numerals are used to represent members having like functions, and repetitive description thereof is omitted for the sake of simplicity. The drawings referred to in the following are only for illustrating the embodiments by way of examples, and are not necessarily drawn to scale.

First Embodiment

FIG. 1 is a schematic diagram for illustrating a configuration of an optical communication system according to a first embodiment of the present invention. The optical communication system according to this embodiment is configured to transmit an optical signal subjected to optical multi-level baseband intensity modulation through an optical fiber transmission line having a relatively short transmission distance of from several hundred meters to several tens of kilometers. The optical communication system according to this embodiment includes an optical transmitter section 1, an optical receiver section 3, and an optical transmission section 4.

The optical transmitter section 1 is an SSB optical pulse amplitude modulation transmitter, and includes a waveform distortion correction circuit 11, an optical IQ modulator 12, a branch point 20, a multi-level coding circuit 21, a square rooting circuit 22, a Hilbert transformer 23, two DA converters 24A and 24B, two driver amplifiers 25A and 25B, and a transmission laser source 26.

The optical receiver section 3 is a direct-detection optical receiver, and includes a PD module 31, an AD converter 32, an equalization circuit 33, and a multi-level decoder 34. The optical transmission section 4 includes an optical fiber transmission line 41, and the optical fiber transmission line 41 is formed of an optical fiber transmission line having a relatively short transmission distance of from several hundred meters to several tens of kilometers.

The main feature of the optical communication system according to this embodiment resides in that the optical transmitter section 1 includes: a single-side band modulation circuit configured to subject a double-side band modulated signal to transformation using single-side band modulation to generate a single-side band modulated signal; a correction circuit configured to correct an intensity of the single-side band modulated signal so that the intensity of the single-side band modulated signal becomes closer to an intensity of the double-side band modulated signal; and an optical modulator configured to output an optical modulated signal based on a modulated signal subjected to the correction by the correction circuit. Further, the optical receiver section 3 is configured to receive the optical modulated signal output by the optical transmitter section 1 to directly detect an intensity component of the optical modulated signal. In order to allow the optical receiver section 3 to conduct optical direct detection, an SSB modulation transformation circuit 10A has a characteristic of transmitting a center carrier component (frequency of zero) required for the optical direct detection as well (residual carrier SSB).

In the optical communication system according to this embodiment, deterioration of a received power waveform generated when an optical intensity modulated signal subjected to SSB modulation is received through direct detection can be suppressed to improve a bit error ratio and a receiver sensitivity of a received SSB signal, which can improve a side-band suppression ratio of the generated SSB signal. In addition, the transmission of the optical modulated signal subjected to SSB modulation and reduction in optical frequency bandwidth is achieved with a simplified configuration involving intensity modulation/direct detection.

In the optical transmitter section 1, an information signal input from the outside is input to the multi-level coding circuit 21, and the multi-level coding circuit 21 encodes the information signal into a quaternary code (DSB modulated signal) exhibiting regular intervals in an optical intensity domain. The square rooting circuit 22 is configured to convert the quaternary code into a multi-level signal in an optical electric field domain. The multi-level signal is divided into two signals at the branch point 20, and one signal becomes a real-part signal i. The other signal is input to the Hilbert transformer 23, and Hilbert transformed by the Hilbert transformer 23 to become an imaginary-part signal q. The two signals are both input to the waveform distortion correction circuit 11. That is, the signal input to the waveform distortion correction circuit 11 includes the real-part signal i and the imaginary-part signal q of an SSB modulated signal. In this case, the SSB modulation transformation circuit 10A configured to generate the SSB modulated signal by subjecting the DSB modulated signal to transformation using SSB modulation includes the branch point 20, the square rooting circuit 22, and the Hilbert transformer 23.

The waveform distortion correction circuit 11 subjects the real-part signal i and the imaginary-part signal q of the SSB modulated signal to a correction operation G (i,q) for a waveform distortion, and outputs a real-part signal i' and an imaginary-part signal q' of the SSB modulated signal subjected to the correction. At this time, an intensity (i'^2+q'^2) of the output signal is corrected so as to become closer to an intensity (i^2) of an input signal i. It is desired that the intensity (i'^2+q'^2) of the output signal be substantially equal to the intensity (i^2) of the input signal i, and it is further desired that the intensity (i'^2+q'^2) be equal to the intensity (i^2). It is also desired that the imaginary-part signal q' be substantially obtained by Hilbert transforming the real-part signal i'. The above-mentioned correction conducted by the waveform distortion correction circuit 11 causes the optical modulated signal output from the optical IQ modulator 12 to have the intensity waveform closer to that of a desired multi-level modulated signal and to become the SSB modulated signal having a suppressed side band.

The output signals (real-part signal i' and imaginary-part signal q') from the waveform distortion correction circuit 11 are converted into analog signals by the DA converters 24A and 24B, amplified by the driver amplifiers 25A and 25B, and then input to a modulation terminal I and a modulation terminal Q of the optical IQ modulator 12 as the real-part signal I and the imaginary-part signal Q, respectively. That is, the real-part signal I and the imaginary-part signal Q are electronic signals input to the optical IQ modulator 12. In this case, the optical IQ modulator 12 is a kind of Mach-Zehnder modulator (LN modulator), and has a double nested structure including two stages of Mach-Zehnder interferometers. Non-modulated light having a fixed intensity output by the transmission laser source 26 is input to the optical IQ modulator 12, and when bias voltages at the modulation terminal I and the modulation terminal Q are close to the zero point of an optical transmission characteristic, a characteristic of linearly modulating the optical electric field for the electronic signal input to each modulation terminal is provided. The real-part signal I and the imaginary-part signal Q are generated based on the real-part signal i' and the imaginary-part signal q', and the optical IQ modulator 12 outputs the optical modulated signal based on the modulated signals (real-part signal i' and imaginary-part signal q') corrected by the waveform distortion correction circuit 11.

The optical modulated signal (optical SSB modulated signal) output from the optical IQ modulator 12 is transmitted on the optical fiber transmission line 41 of the optical transmission section 4, and received by the optical receiver section 3. The received optical modulated signal (SSB signal light) is converted into an analog electronic signal by the PD module 31. Then, the analog electronic signal is converted into a digital signal by the AD converter 32, and subjected to waveform equalization and multi-level code decision processing by the equalization circuit 33 and the multi-level decoder 34 to restore the original information signal. The optical receiver section 3 according to this embodiment is configured to receive an optical multi-level baseband intensity SSB modulated signal by digital signal processing, but the present invention is not limited thereto, and the optical receiver section 3 according to this embodiment may be configured to equalize and decide the analog electronic signal output from the PD module 31 in an analog manner.

Figure 16A:
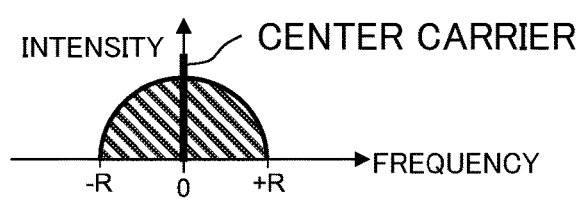
FIGS. 16(a)-16(c) are graphs for showing a principle of SSB modulation.
Figure 16B:
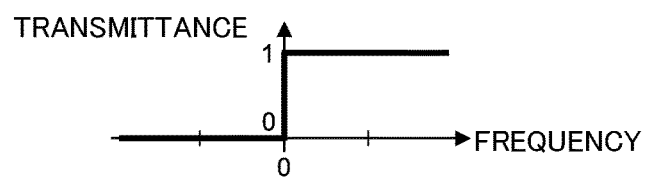

The Hilbert transformer 23 is a digital circuit having a Hilbert transformation characteristic shown in FIG. 16(b). However, the present invention is not limited thereto, and the Hilbert transformer 23 can be approximately replaced by a form, for example, an analog circuit or a band filter configured to extract a single-side band. In this case, the encoding and the Hilbert transformation are achieved by digital signal processing, and as illustrated in FIG. 1, the DA converter 24B is arranged on an output side of the Hilbert transformer 23 to convert the output signal into the analog electronic signal.

Figure 2:
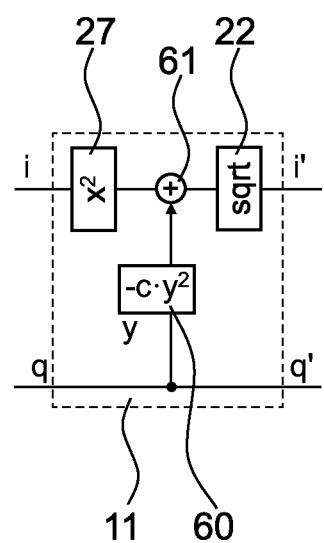
FIG. 2 is a circuit diagram for illustrating an example of a waveform distortion correction circuit according to the first embodiment of the present invention.

FIG. 2 is a circuit diagram for illustrating an example of the waveform distortion correction circuit 11 according to this embodiment. The waveform distortion correction circuit 11 illustrated in FIG. 2 is configured to approximately achieve the above-mentioned correction operation of the waveform distortion correction circuit 11 (first-order approximation correction). The waveform distortion correction circuit 11 includes the square rooting circuit 22, a squaring circuit 27, a negative constant weight squaring circuit 60, and an adder 61. The real-part signal i in the optical electric field domain input to the waveform distortion correction circuit 11 is converted into a real-part intensity signal p by the squaring circuit 27. The imaginary-part signal q in the optical electric field domain input to the waveform distortion correction circuit 11 is divided into two signals in the inside, and one signal is output as it is as the imaginary-part signal q', while the other signal is input to the negative constant weight squaring circuit 60. The negative constant weight squaring circuit 60 is configured to square the input signal, then multiply the squared signal by a fixed negative constant (−C), and output the multiplied signal to the adder 61. The adder 61 is configured to add the two input signals, and output a corrected real-part intensity signal p'. The real-part intensity signal p' is input to the square rooting circuit 22. In this case, the real-part intensity signal p' can be expressed as $p'=p-C*q^2=i^2-C*q^2$ (where the constant C is a constant being substantially 1). That is, the waveform distortion correction circuit 11 is also configured to subtract the intensity of an imaginary-part component of the SSB modulated signal multiplied by a fixed positive constant from the intensity of a real-part component of the SSB modulated signal. The square rooting circuit 22 is configured to convert the real-part intensity signal p' into the signal in the optical electric field domain, and output the signal as the real-part signal i'.

The waveform distortion correction circuit 11 illustrated in FIG. 2 is achieved by conducting first-order approximation for the above-mentioned correction operation of the waveform distortion correction circuit 11 on the assumption that the intensity of the imaginary-part component (imaginary-part signal q) of the SSB modulated signal is sufficiently smaller than the intensity p of the real-part component (real-part signal i). That is, when a desired ideal intensity of the optical multi-level signal is set as $p=i^2$, the intensity of the SSB modulated signal is $(i^2+q^2)$, which produces an error of $q^2$. In view of the foregoing, the waveform distortion correction circuit 11 weakens the intensity of the real-part signal by $q^2$, and outputs the respective signals as $i'=\sqrt{(i^2-C*q^2)}$ and $q'=q$. In this manner, when the correction constant $C=1$, the intensity of the SSB modulated signal is $i'^2+q'^2=i^2$, which matches the ideal intensity of the multi-level signal. As a result of the correction, SSB conditions for the output signal deteriorate, and the side-band suppression ratio slightly deteriorates. However, when the condition of $i^2 \gg q^2$ is satisfied, the amount of the correction conducted by the waveform distortion correction circuit 11 is sufficiently small, which also reduces the deterioration of the side-band suppression ratio. The correction constant C is theoretically optimal when being 1, but in actuality, an optimum point may exist at a point slightly deviated from the correction constant $C=1$ due to a calculation error or an approximation error.

In this embodiment, the multi-level code in the optical intensity domain is generated by the multi-level coding circuit 21, and then converted into the multi-level signal in the optical electric field domain by the square rooting circuit 22, but the present invention is not limited thereto. For example, the function of the square rooting circuit 22 may be integrated into the multi-level coding circuit 21, and the multi-level code in the optical electric field domain may be directly generated by a multi-level coding circuit. Further, in this embodiment, the multi-level code generated by the multi-level coding circuit 21 is set to be a quaternary code, but the present invention is not limited thereto. As long as the code can be applied to the optical multi-level baseband intensity modulation, any particular limitation is not imposed on the number of multi levels or code intervals. For example, six level, eight level, or other such multi-level intensity modulation may be used, and a multi-level code exhibiting substantially regular intervals in an electric field domain (exhibiting irregular intervals in the intensity domain), which is suitable for noise distributions of the optical amplifier and an avalanche photodetector, may be used. The multi-level code may also be a binary code, and a multi-level intensity modulated signal referred to in this specification includes a binary intensity modulated signal.

In this embodiment, the transformation using SSB modulation is achieved so that the imaginary-part signals (q, q', and Q) are obtained by subjecting the real-part signals (i, i', and I) to the Hilbert transformation, but may be achieved so that coordinate transformation is appropriately conducted as long as its internal arithmetic operation is equivalent. As a specific example, real-part signals and imaginary-part signals may be exchanged to obtain the former by subjecting the latter to the Hilbert transformation. There also exist a large number of variations of, for example, conducting rotating coordinate transformation on a plane (I,Q), conducting an arithmetic operation based on polar coordinates, and using an optical IQ modulator for polar coordinate modulation, which are all equivalent configurations.

The optical IQ modulator 12 is employed as the optical IQ modulator in this embodiment, but the present invention is not limited thereto. Any other optical modulators having an optical electric field modulation function essential to the generation of the optical SSB modulated signal may be employed. For example, a configuration for subjecting a differential drive Mach-Zehnder modulator to the polar coordinate modulation and a configuration obtained by connecting an optical intensity modulator or an optical amplitude modulator to an optical phase modulator in a cascade may be employed, and may each appropriately conduct the coordinate transformation and the amplitude/intensity transformation for the output signal depending on the driving method or the format of the output signal.

Along with an explosive increase of mobile terminals and widespread use of cloud computing and the like, traffic is rapidly increasing within and between data centers that are responsible for processing and transmission of information on the Internet. A large part of such ultrahigh speed information transmission is achieved by optical fiber transmission, and it is particularly desired that the speed of the optical fiber transmission line having a relatively short transmission distance of from several hundred meters to several tens of kilometers be greatly increased. The current large-capacity transmission standards are represented by a 100 Gigabit Ethernet (IEEE 802.3 100 GbE), while the standardization of a 400 Gigabit Ethernet with a transmission capacity being further increased fourfold is underway to achieve the next-generation large-capacity optical fiber transmission standard. Large-capacity optical transmitters/receivers for a short distance based on those standards are effectively combined with multi-level modulation (in particular, optical multi-level baseband intensity modulation) that enables large-capacity transmission. The optical communication system according to this embodiment uses an intensity modulated optical multi-level baseband signal, and is optimal for the optical fiber transmission of a relatively short transmission distance of from several hundred meters to several tens of kilometers.

The multi-level modulation is a technology for increasing an optical signal level used for modulation and demodulation from, for example, binary to quaternary, to thereby increase an optical information amount that can be transmitted for one modulation time (symbol). Therefore, the present invention can be widely applied to multi-level intensity modulation. In particular, the optical multi-level baseband intensity modulation, which does not involve band splitting or multicarriers and is configured to modulate only the optical intensity by allocating the information signal to the multi-level signal as it is, is the most simplified configuration, and is a modulation/demodulation scheme suitable for a short-distance purpose. The optical communication system according to this embodiment uses the intensity modulated optical multi-level baseband signal being a quaternary signal, to thereby produce a remarkable effect.

Second Embodiment

Figure 3:
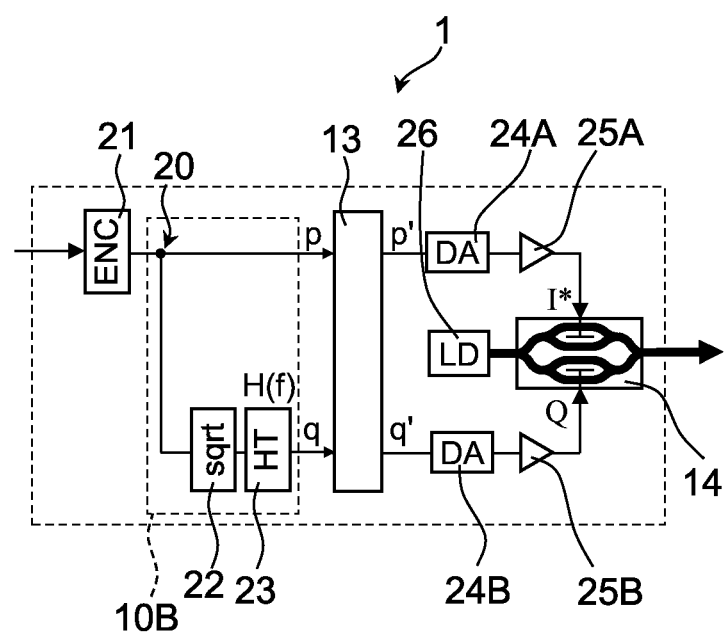
FIG. 3 is a schematic diagram for illustrating a configuration of an optical transmitter section according to a second embodiment of the present invention.

FIG. 3 is a schematic diagram for illustrating a configuration of the optical transmitter section 1 according to a second embodiment of the present invention. The optical communication system according to this embodiment is the same as the optical communication system according to the first embodiment except that the optical transmitter section 1 has a different configuration. Specifically, the square rooting circuit 22 is arranged in a different position, and in accordance with the difference, configurations of a waveform distortion correction circuit 13 and an optical IQ modulator 14 are different. An SSB modulation transformation circuit 10B according to this embodiment includes the branch point 20, the square rooting circuit 22, and the Hilbert transformer 23.

As illustrated in FIG. 3, in the optical transmitter section 1, the multi-level coding circuit 21 outputs a quaternary code. The quaternary code is divided into two signals at the branch point 20, and one signal is input to the waveform distortion correction circuit 13 as the real-part intensity signal p of the SSB modulated signal. The square rooting circuit 22 is arranged in the previous stage of the Hilbert transformer 23. The other signal is converted into the multi-level signal in the optical electric field domain by the square rooting circuit 22. The Hilbert transformer 23 Hilbert transforms the multi-level signal into the imaginary-part signal q of the SSB modulated signal, and inputs the imaginary-part signal q to the waveform distortion correction circuit 13.

Figure 4:
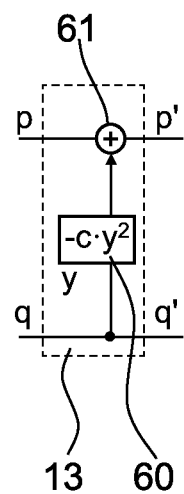
FIG. 4 is a circuit diagram for illustrating an example of a waveform distortion correction circuit according to the second embodiment of the present invention.

FIG. 4 is a circuit diagram for illustrating an example of the waveform distortion correction circuit 13 according to this embodiment. Similarly to the waveform distortion correction circuit 11 according to the first embodiment illustrated in FIG. 2, the waveform distortion correction circuit 13 illustrated in FIG. 4 is configured to approximately achieve the operation of the waveform distortion correction circuit. The waveform distortion correction circuit 13 includes the negative constant weight squaring circuit 60, and the adder 61. The real-part intensity signal p and the imaginary-part signal q are input to the waveform distortion correction circuit 13. The imaginary-part signal q is divided into two signals, and one signal is output as it is as the imaginary-part signal q', while the other signal is input to the negative constant weight squaring circuit 60. The negative constant weight squaring circuit 60 is configured to square the input signal, then multiply the squared signal by a fixed constant (−C), and input the multiplied signal to the adder 61. The adder 61 is configured to add the two input signals, and output the added input signals as the real-part intensity signal p'. The real-part intensity signal p' can be expressed as $p'=p-C*q^2=i^2-C*q^2$ (where the constant C is a constant being substantially 1). The intensity of the DSB modulated signal is equal to the intensity signal p of the real-part component of the SSB modulated signal, and hence the waveform distortion correction circuit 13 is also configured to subtract the intensity of the imaginary-part component of the SSB modulated signal multiplied by a fixed constant from the intensity of the real-part component of the SSB modulated signal.

The output signals (real-part intensity signal p' and imaginary-part signal q') from the waveform distortion correction circuit 13 are converted into analog signals by the DA converters 24A and 24B, amplified by the driver amplifiers 25A and 25B, and then input to the modulation terminal I and the modulation terminal Q of the optical IQ modulator 14 as a real-part intensity signal I* and the imaginary-part signal Q, respectively. That is, the real-part intensity signal I* and the imaginary-part signal Q are electronic signals input to the optical IQ modulator 14, and the optical IQ modulator 14 is configured to generate the optical modulated signal based on the intensity signal I* and the imaginary-part signal Q. The modulation terminal I for inputting the real-part intensity signal I* (modulation terminal I*) is set to have a bias point near a shorter part of an optical intensity transmission characteristic (bias point is an intensity 50% transmission point) so that intensity modulation can be achieved by a child MZ modulator inside the optical IQ modulator 14. In contrast, the imaginary-part signal Q input to the modulation terminal Q is used for imaginary-part electric field modulation of the optical signal (the bias point is the zero point). In this manner, it is possible to approximately generate the optical multi-level baseband intensity SSB modulated signal with a reduced waveform distortion.

In the same manner as the optical communication system according to the first embodiment, the optical communication system according to this embodiment can suppress the deterioration of the received power waveform, improve the bit error ratio and the receiver sensitivity of the received SSB signal, and improve the side-band suppression ratio of the SSB signal. In addition, the real-part intensity signal I* is input to the modulation terminal I of the optical IQ modulator 14 according to this embodiment. The bias point of the modulation terminal I is set to the intensity 50% (90° bias), to thereby enable the optical IQ modulator 14 to output the optical modulated signal based on the real-part intensity signal I* and the imaginary-part signal Q. The waveform distortion correction circuit 13 outputs the real-part intensity signal p' and the imaginary-part signal q', and the optical IQ modulator 14 outputs the optical modulated signal based on the modulated signal (real-part intensity signal p' and imaginary-part signal q') corrected by the waveform distortion correction circuit 13. A waveform distortion correction circuit has a configuration for conducting an arithmetic operation of $p'=p-C*q^2$, and hence the waveform distortion correction circuit 13 has a more simplified circuit configuration by being configured to output the real-part intensity signal p'. Further, by setting a real-part intensity signal as the input signal to the modulation terminal I, it is possible to form an optical transmitter section with a more simplified circuit configuration.

Third Embodiment

Figure 5:
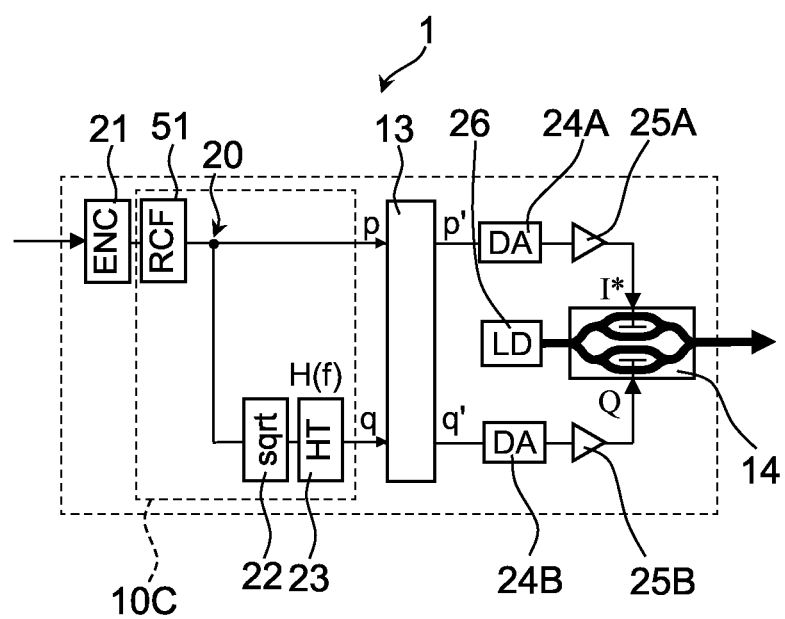
FIG. 5 is a schematic diagram for illustrating a configuration of an optical transmitter section according to a third embodiment of the present invention.
Figure 6A:
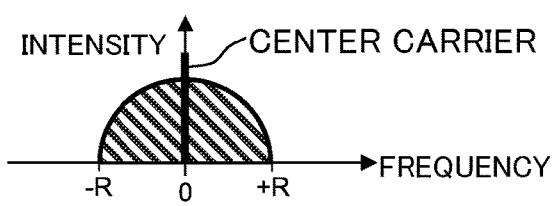
FIGS. 6(a)-6(d) are graphs for schematically showing electronic signal spectrums according to the third embodiment of the present invention.
Figure 6B:
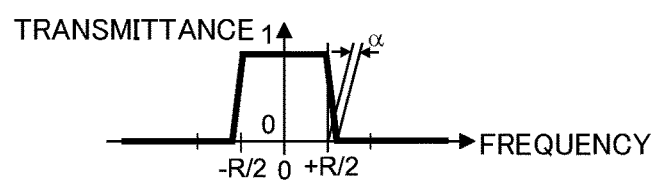
Figure 6C:
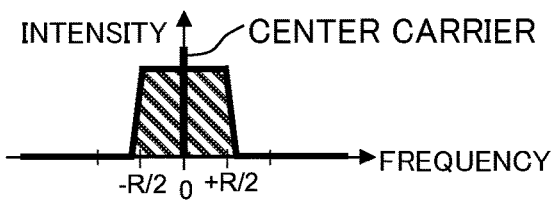
Figure 6D:
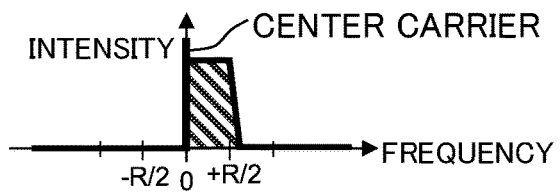

FIG. 5 is a schematic diagram for illustrating a configuration of the optical transmitter section 1 according to a third embodiment of the present invention. The optical communication system according to this embodiment is the same as the optical communication system according to the second embodiment except that the optical transmitter section 1 further includes a Nyquist filter 51 having a Nyquist filter transmission characteristic. In the optical transmitter section 1, the Nyquist filter 51 is arranged in the subsequent stage of the multi-level coding circuit 21. An SSB modulation transformation circuit 10C according to this embodiment includes the branch point 20, the square rooting circuit 22, the Hilbert transformer 23, and the Nyquist filter 51. With this configuration, optical Nyquist modulation that further constricts the band of the optical signal is achieved. The Nyquist modulation is a technology for reducing the signal frequency band by about ½ by forming an electronic signal spectrum so as to have a rectangular shape. One example of the optical multi-level Nyquist modulation is disclosed in R. Hirai, H. Toyoda, and N. Kikuchi, "Proposal of new 400 GbE signaling formats with 4λ×100G configuration", IEEE 802.3 400 GbE Study Group.

FIG. 6 is graphs for schematically showing electronic signal spectrums according to this embodiment. FIG. 6(a) is the graph for showing a spectrum of an electronic multi-level signal input to the Nyquist filter 51, and its signal bandwidth is about 2R (where R represents a modulation speed, and the bandwidth is the same in an optical domain). The Nyquist filter 51 according to this embodiment is a raised cosine filter (roll-off factor α), and FIG. 6(*b*) is the graph for showing a frequency characteristic (transmission intensity) of the Nyquist filter 51. The frequency characteristic is a transmission characteristic (Nyquist transmission characteristic) exhibiting a substantially rectangular shape having a width of about R (−R/2 to +R/2), and is provided with inclinations of the roll-off factor α on both sides of the filter in order to reduce an error caused when a finite number of stages of filters are mounted. That is, a transmittance is 0 in a domain having a frequency lower than −R/2 (strictly, equal to or lower than −(R/2+α)), and the transmittance increases from 0 to 1 in a domain having a frequency range of α from −(R/2+α) to −R/2. The transmittance is 1 in a domain having a frequency range from −R/2 to +R/2, and the transmittance decreases from 1 to 0 in a domain having a frequency range from R/2 to R/2+α. The transmittance is 0 in a domain having a frequency higher than R/2 (equal to or higher than R/2+α).

FIG. 6(*c*) is the graph for showing a spectrum of the electronic signal (electronic multi-level Nyquist signal) output by the Nyquist filter 51, which is a substantially rectangular spectrum having a width of about R. The spectrum has the frequency bandwidth reduced by about ½ compared with FIG. 6(*a*). FIG. 6(*d*) is the graph for showing a spectrum of an electronic signal transformed through SSB modulation (electronic multi-level Nyquist SSB modulated signal), which is a substantially rectangular spectrum having a width of about R/2. The frequency bandwidth is further reduced by ½ compared with FIG. 6(*c*). As a result, it is possible to obtain the optical multi-level baseband intensity SSB modulated signal having an extremely low band.

The Nyquist filter 51 is a distortionless rectangular spectrum filter that satisfies Nyquist conditions, which is widely used in the communications field, and can be easily achieved through use of an FIR filter. In this embodiment, the Nyquist filter is arranged only at the transmitting end (optical transmitter section 1), but the present invention is not limited thereto, and root-raised cosine filters may be used to separately arrange the Nyquist filters at the transmitting end (optical transmitter section 1) and at the receiving end (optical receiver section 3).

Fourth Embodiment

Figure 7:
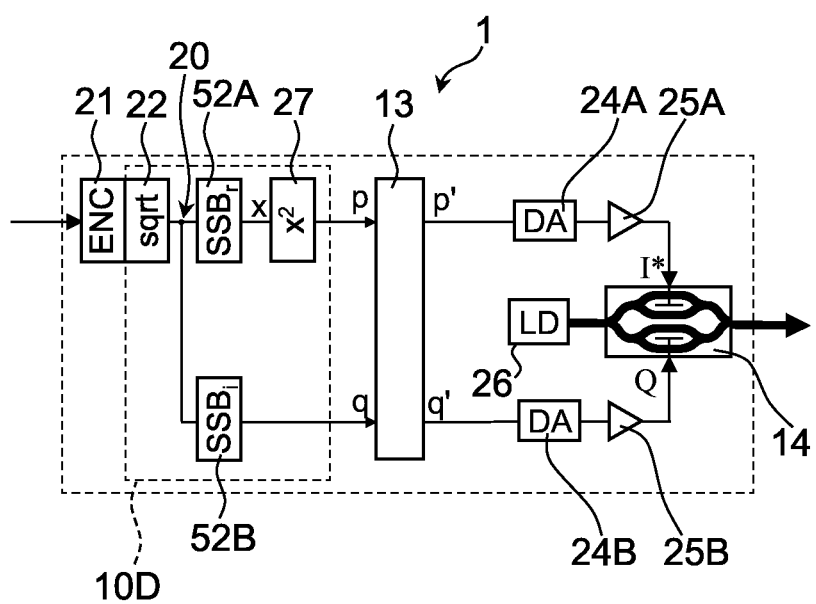
FIG. 7 is a schematic diagram for illustrating a configuration of an optical transmitter section according to a fourth embodiment of the present invention.

FIG. 7 is a schematic diagram for illustrating a configuration of the optical transmitter section 1 according to a fourth embodiment of the present invention. The optical communication system according to this embodiment is the same as the optical communication system according to the third embodiment except that an SSB modulation transformation circuit within the optical transmitter section 1 has a different configuration. An SSB modulation transformation circuit 10D according to this embodiment includes the branch point 20, the square rooting circuit 22, the squaring circuit 27, and Nyquist SSB filters 52A and 52B. The Nyquist SSB filters 52A and 52B are filters capable of conducting collective filtering by combining a Nyquist filter and a SSB filter. That is, the Nyquist filter and the Hilbert transformer are replaced by the Nyquist SSB filter 52A (real part) and the Nyquist SSB filter 52B (imaginary part). The SSB modulation transformation circuit 10D includes the Nyquist SSB filters 52A and 52B having the function of the Nyquist filter.

In this embodiment, the square rooting circuit 22 is arranged in the subsequent stage of the multi-level coding circuit 21, and configured to convert the multi-level signal in the intensity domain into the multi-level signal in the optical electric field domain. Therefore, the real-part signal is input to the Nyquist SSB filter 52A. The output signal output from the Nyquist SSB filter 52A is the real-part signal, and hence the squaring circuit 27 is arranged in the subsequent stage of the Nyquist SSB filter 52A, and configured to convert the real-part signal into the real-part intensity signal p.

Figure 8A:
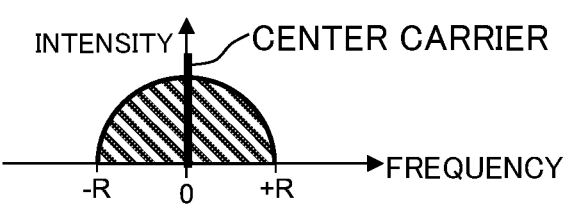
FIGS. 8(a)-8(c) are graphs for schematically showing electronic signal spectrums according to fourth embodiment of the present invention.
Figure 8B:
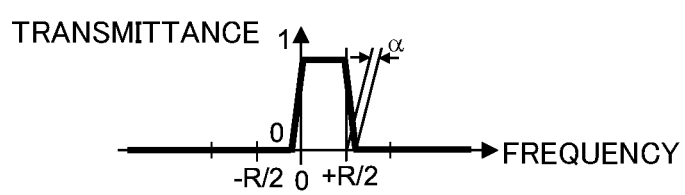
Figure 8C:
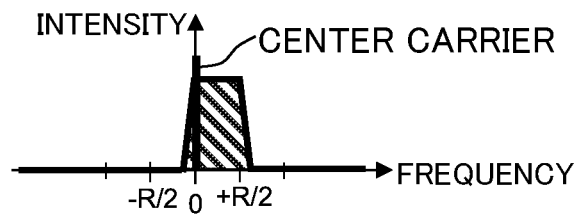
Figure 16C:
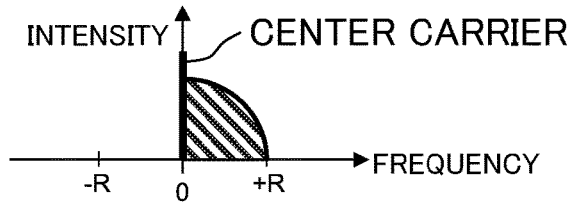
Figure 17A:
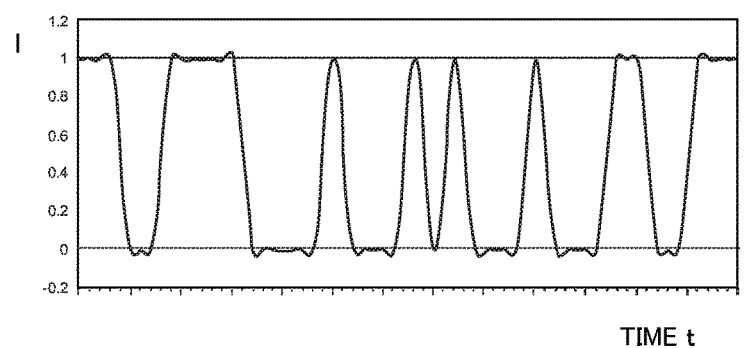
FIGS. 17(a)-17(b) are graphs for showing waveforms of an optical SSB modulated signal.
Figure 17B:
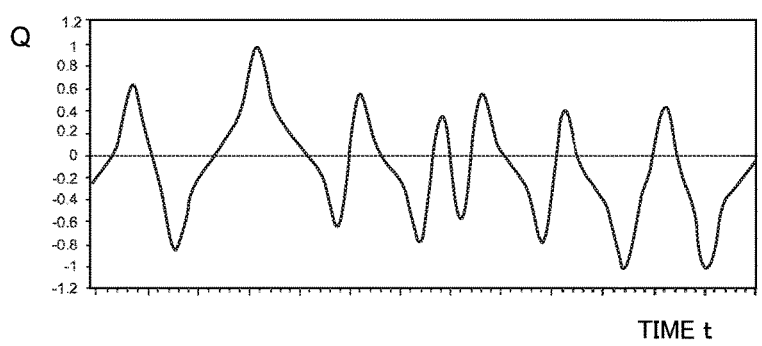
Figure 18A:
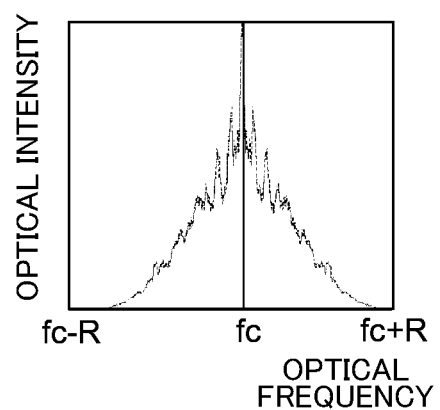
FIGS. 18A(a) and 18A(b) are graphs for showing a spectrum of an optical amplitude modulated signal.
Figure 18A:
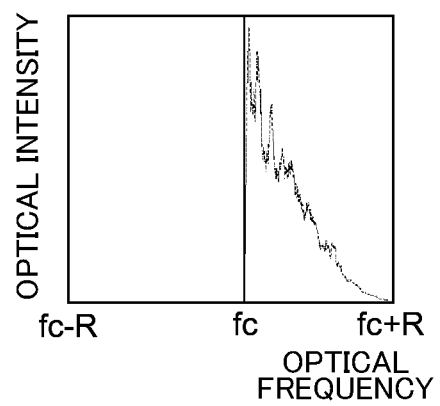
Figure 18B:
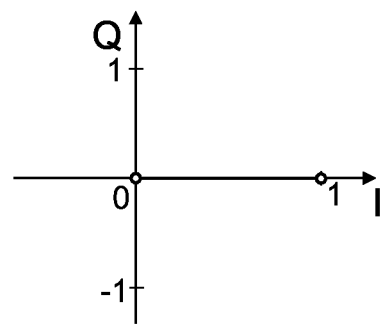
FIGS. 18B(a) and 18B(b) are graphs for showing a signal point constellation of the optical amplitude modulated signal.
Figure 18B:
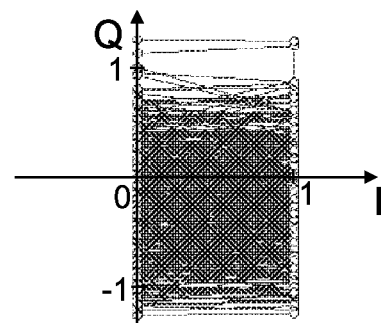
Figure 18C:
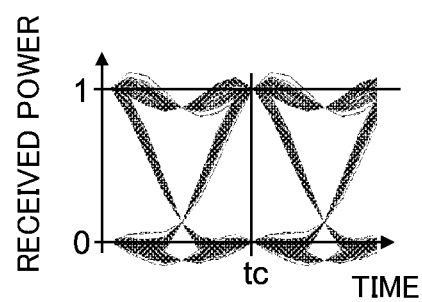
FIGS. 18C(a) and 18C(b) are graphs for showing a received power waveform of the optical amplitude modulated signal.
Figure 18C:
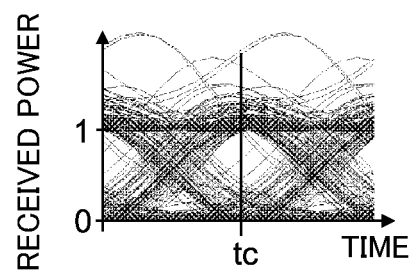

FIG. 8 is graphs for schematically showing electronic signal spectrums according to this embodiment. FIG. 8(*a*) is the graph for showing a spectrum of an electronic multi-level signal input to the Nyquist SSB filters 52A and 52B (signal bandwidth is about 2R). As shown in FIG. 16(*b*), it is conceivable that the transformation using SSB modulation is band filtering of the frequency domain for extracting only a one-side spectrum of the signal, and therefore can be achieved by being combined with the Nyquist filter configured to conduct the filtering of the spectrum domain in the same manner. FIG. 8(*b*) is the graph for showing a frequency characteristic (transmission intensity) of each of the Nyquist SSB filters 52A and 52B. The frequency characteristic shown in FIG. 8(*b*) is obtained by combining the Nyquist filter 51 shown in FIG. 6(*b*) and the transformation using SSB modulation shown in FIG. 16(*b*). The frequency characteristic of each of the Nyquist SSB filters 52A and 52B according to this embodiment is provided with inclinations of the roll-off factor α on both sides of the filter in the same manner as the frequency characteristic of the Nyquist filter 51 according to the third embodiment. FIG. 8(*c*) is the graph for showing a spectrum of the electronic signal (electronic multi-level Nyquist SSB modulated signal) output by the Nyquist SSB filters 52A and 52B, which is a substantially rectangular spectrum having a width of about R/2. The spectrum has the frequency bandwidth reduced by about ¼ compared with FIG. 8(*a*).

Fifth Embodiment

Figure 9:
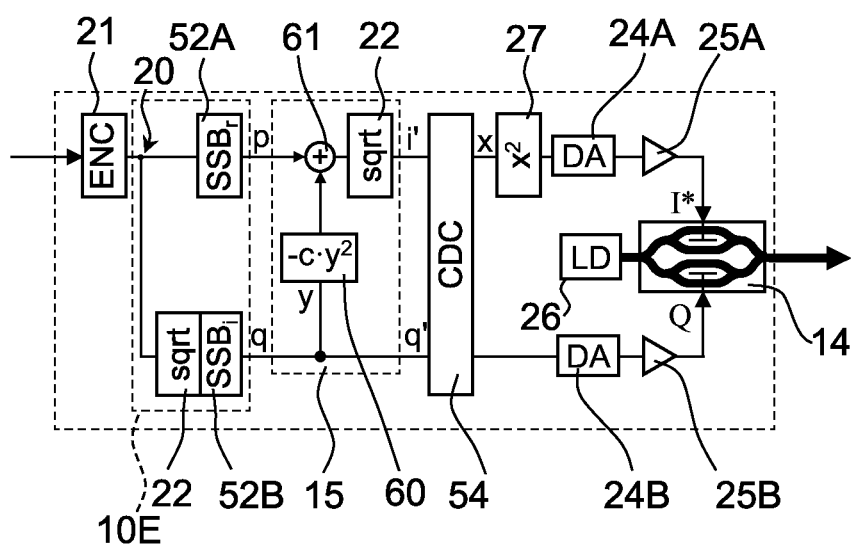
FIG. 9 is a schematic diagram for illustrating a configuration of an optical transmitter section according to a fifth embodiment of the present invention.

FIG. 9 is a schematic diagram for illustrating a configuration of the optical transmitter section 1 according to a fifth embodiment of the present invention. The optical communication system according to this embodiment is the same as the optical communication system according to the fourth embodiment except that the optical transmitter section 1 has a different configuration. Specifically, this embodiment is different from the fourth embodiment in the following points. Firstly, in an SSB modulation transformation circuit 10E according to this embodiment, the square rooting circuit 22 is arranged between the branch point 20 and the Nyquist SSB filter 52B, and the squaring circuit 27 is not arranged in the subsequent stage of the Nyquist SSB filter 52A. Secondly, a waveform distortion correction circuit 15 further includes the square rooting circuit 22. Thirdly, the optical transmitter section 1 further includes a chromatic dispersion compensator 54 (CDC) and the squaring circuit 27.

The SSB modulation transformation circuit 10E according to this embodiment includes the branch point 20, the square rooting circuit 22, and the Nyquist SSB filters 52A and 52B. In the SSB modulation transformation circuit 10E, the square rooting circuit 22 is arranged between the branch point 20 and the Nyquist SSB filter 52B, and is configured to approximately move the position of a sqrt operation conducted by the square rooting circuit 22. The multi-level code (multi-level intensity signal) output by the multi-level coding circuit 21 is divided into two signals at the branch point 20, and one signal is input to the Nyquist SSB filter 52A (real part) to become the real-part intensity signal p. Therefore, unlike in the fourth embodiment, the squaring circuit 27 is not arranged in the subsequent stage of the Nyquist SSB filter 52A. Further, the other signal is input to the square rooting circuit 22 to be converted into an electric field signal (multi-level signal in the optical electric field domain), and then input to the Nyquist SSB filter 52B (imaginary part) to become the imaginary-part signal q. Strictly, the order of the square rooting circuit 22 and the Nyquist SSB filter 52B (imaginary part) needs to be reversed, but the output signal of the Nyquist SSB filter 52B (imaginary part) has both positive and negative signs, and hence special code processing needs to be conducted by the square rooting circuit 22 in the subsequent stage. Therefore, the two circuits are approximately mounted in the reverse order in this embodiment, but it has been confirmed that there is no significant influence on the performance.

In the waveform distortion correction circuit 15, the square rooting circuit 22 is arranged in the subsequent stage of the adder 61 unlike the waveform distortion correction circuit 13 illustrated in FIG. 4. The square rooting circuit 22 is configured to convert the real-part intensity signal p' output by the adder 61 into the signal in the optical electric field domain, and output the signal as a new real-part signal i'. Therefore, the input signals to the waveform distortion correction circuit 15 are the real-part intensity signal p and the imaginary-part signal q, and the output signals from the waveform distortion correction circuit 15 are the real-part signal i' and the imaginary-part signal q'. The real-part intensity signal p' output by the adder 61 always takes a positive value, and hence the sign does not need to be taken into consideration for the square rooting circuit 22 in the subsequent stage.

In the optical transmitter section 1, the chromatic dispersion compensator 54 is arranged between the waveform distortion correction circuit 15 and the optical IQ modulator 14. The chromatic dispersion compensator 54 is arranged in the subsequent stage of the waveform distortion correction circuit 15, and the real-part signal i' and the imaginary-part signal q' output by the waveform distortion correction circuit 15 are input to the chromatic dispersion compensator 54. The chromatic dispersion compensator 54 is a circuit configured to apply a transfer function reverse to the chromatic dispersion of the optical fiber transmission line 41 in advance, and can compensate the deterioration of the waveform caused by the optical fiber transmission and extend the transmission distance. In this embodiment, the squaring circuit 27 is arranged in the subsequent stage of the chromatic dispersion compensator 54, and is configured to convert the real-part signal output by the chromatic dispersion compensator 54 into the real-part intensity signal, and the real-part intensity signal is input to the DA converter 24A.

Figure 10A:
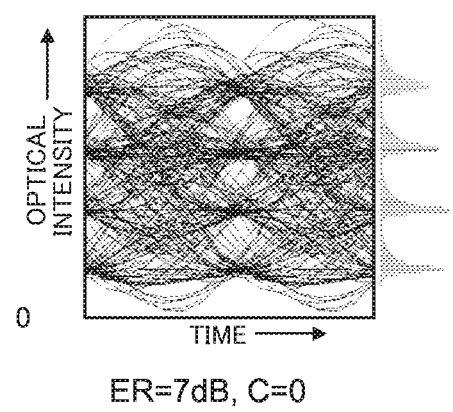
FIG. 10A is a graph for showing a numerical simulation result obtained through use of the optical communication system according to the fifth embodiment of the present invention.
Figure 10B:
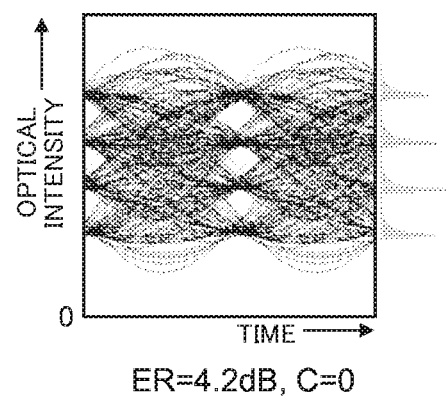
FIG. 10B is a graph for showing a numerical simulation result obtained through use of the optical communication system according to the fifth embodiment of the present invention.
Figure 10C:
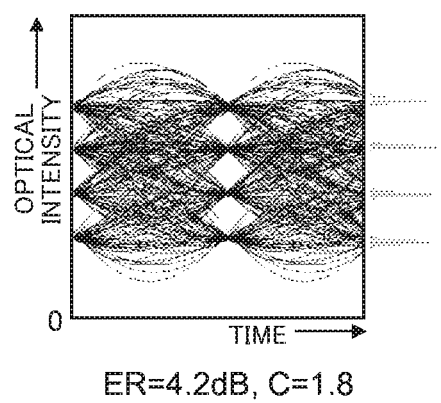
FIG. 10C is a graph for showing a numerical simulation result obtained through use of the optical communication system according to the fifth embodiment of the present invention.
Figure 10D:
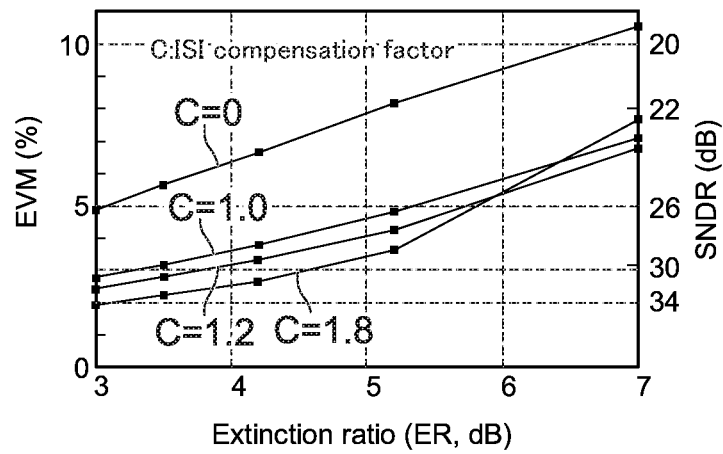
FIG. 10D is a graph for showing a numerical simulation result obtained through use of the optical communication system according to the fifth embodiment of the present invention.

FIG. 10A to FIG. 10D are graphs for showing numerical simulation results obtained through use of the optical communication system according to this embodiment. In the numerical simulation, an intensity modulated optical quaternary Nyquist signal light is generated, and received through the direct detection. FIG. 10A to FIG. 10C are the graphs for showing a received power waveform of the optical SSB modulated signal calculated by the numerical simulation, and a histogram of the waveform at a waveform center time is shown on the right side of the received power waveform. FIG. 10D is a graph for showing an error vector amplitude (EVM). In the graphs, ER represents an extinction ratio (ER=L3/L0, where L3 represents the maximum level of the quaternary signal and L0 represents the minimum level of the quaternary signal) of the optical multi-level signal output from an optical transmitter.

FIG. 10A is the graph for showing a case where the extinction ratio is set to 7 dB and the waveform distortion correction circuit 15 is turned off (C=0). A large distortion is caused in the received power waveform, and the histogram is greatly widened. This is because the intensity of the imaginary-part signal added through Hilbert transformation causes the waveform distortion as described above. FIG. 10B is the graph for showing a case where the bias point of the modulation terminal I* of the optical IQ modulator 14 is adjusted to lower the extinction ratio of the optical quaternary signal to 4.2 dB. In the same manner as in FIG. 10A, the waveform distortion correction circuit 15 is turned off (C=0). The received power waveform shown in FIG. 10B has the waveform distortion reduced compared with FIG. 10A. This is because the lowering of the extinction ratio causes a modulation amplitude to become smaller, which causes the deterioration in receiver sensitivity, but the intensity of the imaginary-part component becomes relatively smaller than that of the real-part component, which reduces the waveform distortion. FIG. 10C is the graph for showing a case where the extinction ratio is set to 4.2 dB and the waveform distortion correction circuit 15 conducts the correction with the correction constant C being set to C=1.8.

FIG. 10B and FIG. 10C are the graphs for both showing the case where the extinction ratio is set to 4.2 dB, which is a value used in the past for experiments of an intensity modulated optical quaternary Nyquist signal, and is appropriate for practical use as well. A large wavelength distortion remains in the center and the histogram of the received power waveform shown in FIG. 10B, but the waveform distortion is remarkably reduced in the received power waveform shown in FIG. 10C compared with that of FIG. 10B. The spread of the histogram is remarkably reduced as well.

FIG. 10D is the graph for showing an amount of the waveform distortion exhibited after the reception with respect to the extinction ratio of an optical multi-level SSB modulated signal. In FIG. 10D, the horizontal axis represents the extinction ratio, the left vertical axis represents the EVM serving as an index of the waveform distortion, and the right vertical axis represents a signal-to-noise and distortion ratio (SNDR) corresponding to the EVM value. C represents an ISI compensation factor C of the negative constant weight squaring circuit 60 of the waveform distortion correction circuit 15. ISI stands for inter-symbol interference, which means the waveform distortion.

In order to obtain satisfactory signal quality that exerts no influence on the transmission characteristic, it is desired that EVM<5% (SNDR>26 dB), and it is further desired that EVM<3% (SNDR>30 dB). When the waveform distortion correction circuit 15 is turned off (C=0), for example, the received power waveform shown in FIG. 10B has an EVM of about 7% (SNDR of about 24 dB), which does not meet those criteria.

In contrast, in the numerical simulation used when the correction is conducted by the waveform distortion correction circuit 15, great improvements in EVM and SNDR are confirmed as in the curved line of C=1.0 shown in FIG. 10D. In the numerical simulation for a plurality of values of the correction constant C, ER is smaller than 6 dB with the minimum waveform distortion in the case where C=1.8.

When C=1.8, the wavelength distortion of the received power waveform is greatly reduced as well, and a satisfactory received power waveform shown in FIG. 10C is obtained. It has been confirmed that the received power waveform exhibiting as high quality as EVM=2.7% (SNDR=31.3 dB) is obtained under the condition of the extinction ratio of 4.2 dB.

Figure 11A:
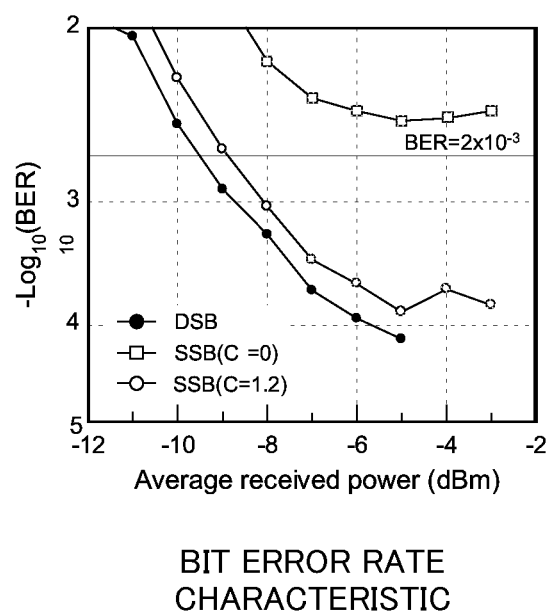
FIG. 11A is a graph for showing a bit error ratio characteristic of an intensity modulated optical quaternary Nyquist signal empirically generated in the optical communication system according to the fifth embodiment of the present invention.
Figure 11B:
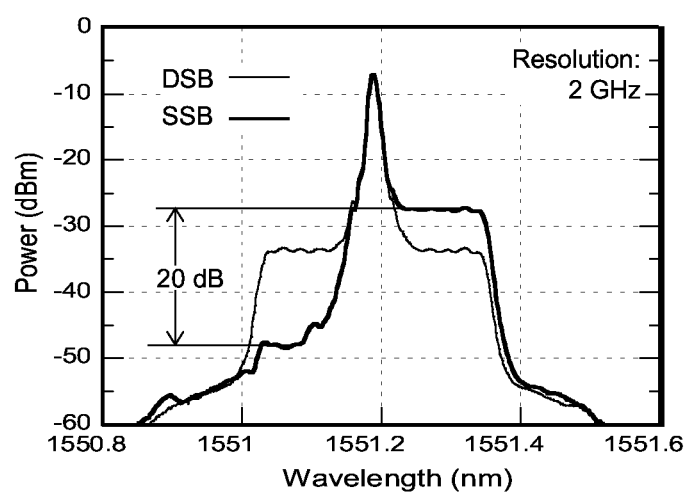
FIG. 11B is a graph for showing a frequency spectrum of the intensity modulated optical quaternary Nyquist signal empirically generated in the optical communication system according to the fifth embodiment of the present invention.

FIG. 11A and FIG. 11B are graphs for showing a bit error ratio characteristic and a frequency spectrum, respectively, of the intensity modulated optical quaternary Nyquist signal empirically generated in the optical communication system according to this embodiment. In the experiment, it was confirmed that the waveform distortion of the received power waveform was minimal when the correction constant C=1.2, which is slightly different from the numerical simulation results shown in FIG. 10A to FIG. 10D. In this manner, it is desired that the correction constant C be equal to or larger than 1 and equal to or smaller than 2. In particular, it is further desired that the correction constant C be equal to or larger than 1.2 and equal to or smaller than 1.8.

In FIG. 11A, the horizontal axis represents an average received power (dBm), and the vertical axis represents the bit error ratio characteristic (BER) by a logarithmic scale. In FIG. 11A, the symbol "●" represents the bit error ratio exhibited when an optical DSB modulated signal is directly detected, the symbol "□" represents the bit error ratio exhibited when the optical SSB modulated signal generated with the waveform distortion correction circuit 15 being turned off (C=0) is directly detected, and the symbol "○" represents the bit error ratio exhibited when the optical SSB modulated signal generated by conducting the correction (C=1.2) by the waveform distortion correction circuit 15 is directly detected.

When the optical SSB modulated signal generated with the waveform distortion correction circuit 15 being turned off (C=0) is directly detected, the bit error ratio greatly deteriorates due to the waveform distortion caused through SSB modulation, and a floor of the bit error ratio occurs. When C=0, it is not possible to obtain the bit error ratio that satisfies a criterion of being equal to or smaller than a bit error ratio of $2 \times 10^{-3}$ being an error correction threshold value of a hard-decision error correction circuit (SuperFEC) having a redundancy of about 6% which is widely used for optical communications. In contrast, when the correction (C=1.2) is conducted by the waveform distortion correction circuit 15, the bit error ratio is greatly improved as shown in FIG. 11A, and the receiver sensitivity from the receiver sensitivity of the optical DSB modulated signal deteriorates only by 0.6 dB.

In FIG. 11B, the horizontal axis represents the wavelength, and the vertical axis represents the power. In FIG. 11B, the frequency spectrum of an intensity modulated optical quaternary Nyquist SSB signal is indicated by the bold line, and the frequency spectrum of an intensity modulated optical quaternary Nyquist DSB signal is indicated by the thin line for reference. The optical SSB modulated signal output by the optical transmitter section 1 has as high a side-band suppression ratio as about 20 dB, and the optical communication system according to this embodiment produces a remarkable effect.

Sixth Embodiment

Figure 12:
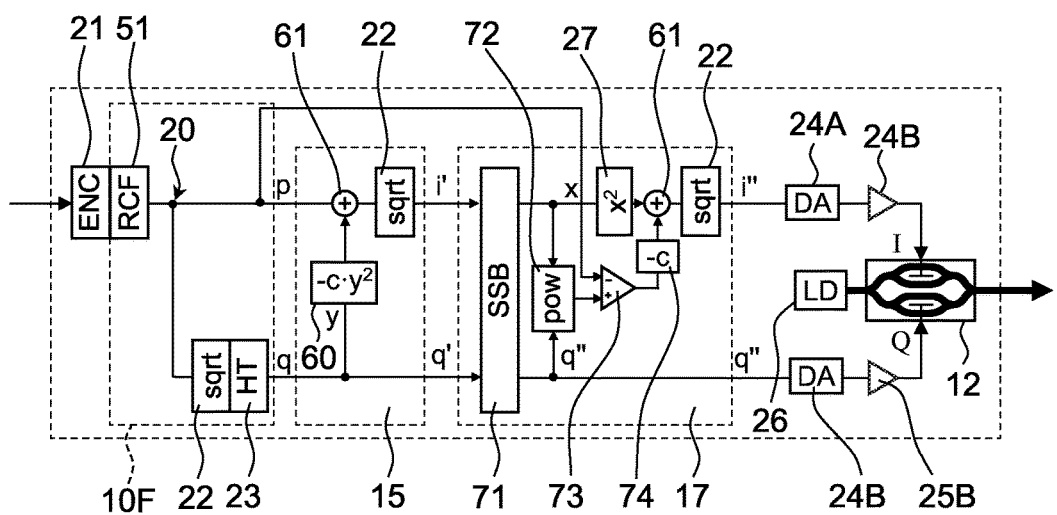
FIG. 12 is a schematic diagram for illustrating a configuration of an optical transmitter section according to a sixth embodiment of the present invention.

FIG. 12 is a schematic diagram for illustrating a configuration of the optical transmitter section 1 according to a sixth embodiment of the present invention. The optical communication system according to this embodiment is the same as the optical communication systems according to the first to fifth embodiments except that the optical transmitter section 1 has a different configuration. The main feature of the optical transmitter section 1 according to this embodiment resides in that a subsequent-stage waveform distortion correction circuit 17 (another correction circuit) is arranged between the waveform distortion correction circuit 15 and the optical IQ modulator 12 in addition to the waveform distortion correction circuit 15. That is, the optical transmitter section 1 according to this embodiment has a multistage configuration of waveform distortion correction circuits, to thereby be able to further improve correction accuracy for correcting the optical SSB modulated signal.

The quaternary code in the optical intensity domain output by the multi-level coding circuit 21 is input to an SSB modulation transformation circuit 10F. The SSB modulation transformation circuit 10F has the same configuration as that of the SSB modulation transformation circuit 10C according to the third embodiment illustrated in FIG. 5. The real-part intensity signal p and the imaginary-part signal q output by the SSB modulation transformation circuit 10F are input to the waveform distortion correction circuit 15. The waveform distortion correction circuit 15 is a waveform distortion correction circuit in the first-stage, and has the same configuration as that of the waveform distortion correction circuit 15 according to the fifth embodiment illustrated in FIG. 9. As described above, the waveform distortion correction circuit 15 conducts the waveform distortion correction in first-order approximation, and outputs the real-part signal i' and the imaginary-part signal q' (first modulated signal) being the SSB modulated signal subjected to the correction in the first stage. The above-mentioned signal is input to the subsequent-stage waveform distortion correction circuit 17 (another correction circuit) being a waveform distortion correction circuit in the second stage.

The subsequent-stage waveform distortion correction circuit 17 is a waveform distortion correction circuit for multistage connection, and is configured to, when the real-part signal i' and the imaginary-part signal q' of the SSB modulated signal are input, further subject the input SSB modulated signal to the waveform distortion correction, and output a real-part signal i" and an imaginary-part signal q" being the SSB modulated signal further subjected to the correction. That is, the subsequent-stage waveform distortion correction circuit 17 is configured to subject the input SSB modulated signal (first modulated signal) to the transformation using SSB modulation, generate the modulated signal (second modulated signal) subjected to the SSB modulation again, and correct the intensity of the above-mentioned modulated signal so that the intensity becomes closer to the intensity of the DSB modulated signal.

In this embodiment, one subsequent-stage waveform distortion correction circuit 17 is arranged in the subsequent stage of the waveform distortion correction circuit 15 (two stages), but the present invention is not limited thereto, and a plurality of subsequent-stage waveform distortion correction circuits 17 may be arranged in the subsequent stage of the waveform distortion correction circuit 15. By arranging a desired number of stages of subsequent-stage waveform distortion correction circuits 17, it is possible to repeatedly conduct the waveform distortion correction the number of times corresponding to the desired number of stages, and improve the accuracy in consecutive operation.

The subsequent-stage waveform distortion correction circuit 17 includes a complex SSB modulation transformation circuit 71, an intensity detection circuit 72, a subtraction circuit 73, a negative constant multiplication circuit 74, the square rooting circuit 22, the squaring circuit 27, and the adder 61. The complex SSB modulation transformation circuit 71 is configured to conduct the transformation using SSB modulation for the real-part signal i' and the imaginary-part signal q' that have been input, and output a real-part signal x and the imaginary-part signal q" subjected to the SSB modulation again. The real-part signal x and the imaginary-part signal q" are each divided into two signals.

One real-part signal x and one imaginary-part signal q" are each input to the intensity detection circuit 72. The intensity detection circuit 72 is configured to calculate the intensity (intensity signal) of the input signal, and the intensity signal output by the intensity detection circuit 72 is input to the subtraction circuit 73 arranged in the subsequent stage. The real-part intensity signal p output by the SSB modulation transformation circuit 10F is also input to the subtraction circuit 73, and the subtraction circuit 73 is configured to subtract the real-part intensity signal p from the intensity signal output by the intensity detection circuit 72, and output a waveform error signal. The waveform error signal is input to the negative constant multiplication circuit 74 arranged in the subsequent stage of the subtraction circuit 73, and the negative constant multiplication circuit 74 is configured to multiply the waveform error signal by a negative constant (−C), and output the multiplied signal to the adder 61. In this case, the correction constant C is a constant of substantially 1.

The other real-part signal x is input to the squaring circuit 27, converted into the real-part intensity signal, and output to the adder 61. The adder 61 is configured to add the two input signals, and output the added input signals as the real-part intensity signal further subjected to the correction, and the real-part intensity signal is input to the square rooting circuit 22. The square rooting circuit 22 is configured to convert the real-part intensity signal into the real-part signal i", and output the real-part signal i". The other imaginary-part signal q" is output as it is.

In the optical communication system according to this embodiment, the transformation using SSB modulation and the waveform distortion correction are repeated a plurality of times, and it is possible to generate an SSB waveform with higher precision, and improve the receiver sensitivity and the side-band suppression ratio. In this embodiment, the waveform distortion correction circuits having different configurations between the first stage and the second stage are used, but may be achieved with the same correction circuits by using the subsequent-stage waveform distortion correction circuit 17 in place of the SSB modulation transformation circuit 10F and the waveform distortion correction circuit 15. Further, the multistage has no limitations in terms of the number of stages, and any one of the intensity domain and the electric field domain may be used for the input and output signals to/from the correction circuit.

Seventh Embodiment

Figure 13:
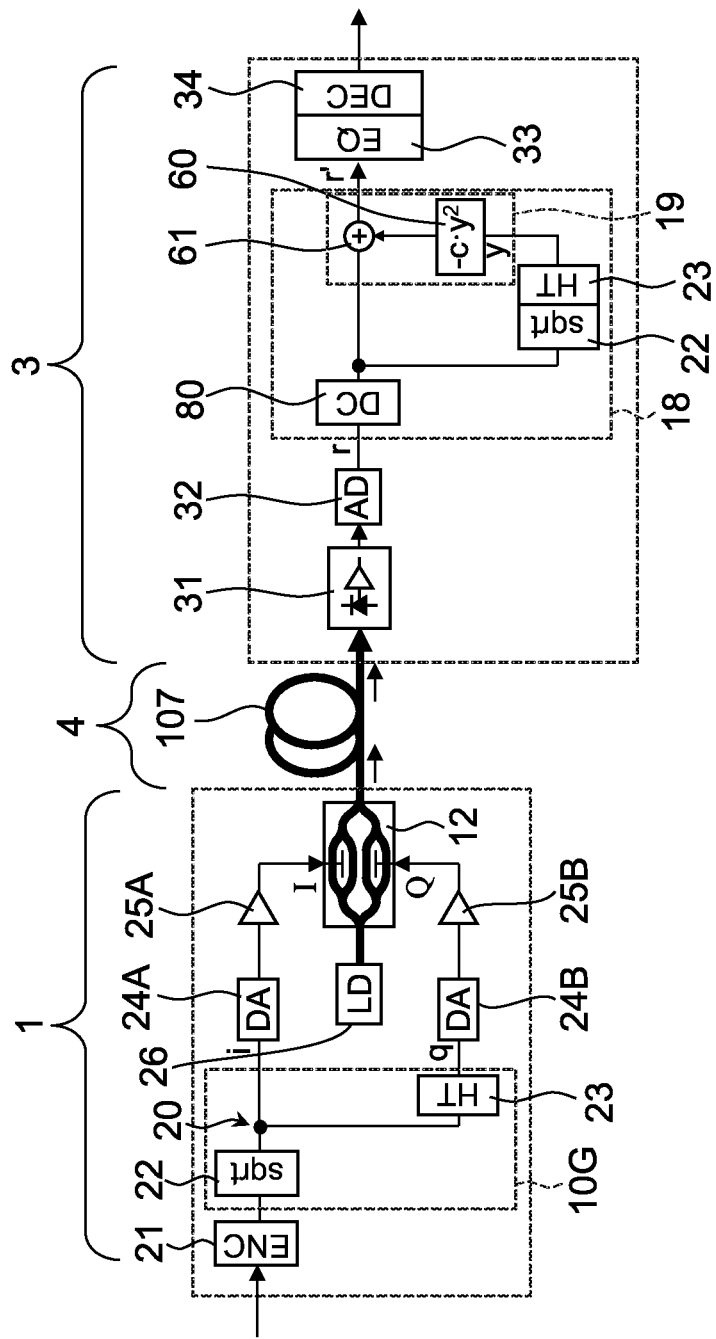
FIG. 13 is a schematic diagram for illustrating a configuration of an optical communication system according to a seventh embodiment of the present invention.

FIG. 13 is a schematic diagram for illustrating a configuration of an optical communication system according to a seventh embodiment of the present invention. The optical communication system according to this embodiment is the same as the optical communication system according to the first embodiment except that not the optical transmitter section 1 but the optical receiver section 3 includes a waveform distortion correction circuit 19.

The optical transmitter section 1 according to this embodiment has a configuration obtained by excluding the waveform distortion correction circuit 11 from the optical transmitter section 1 according to the first embodiment illustrated in FIG. 1. That is, an SSB modulation transformation circuit 10G has the same configuration as that of the SSB modulation transformation circuit 10A according to the first embodiment illustrated in FIG. 1. That is, the optical transmitter section 1 includes: the SSB modulation transformation circuit 10G configured to subject the DSB modulated signal to the transformation using SSB modulation to generate the SSB modulated signal; and the optical IQ modulator 12 configured to output the optical modulated signal based on the SSB modulated signal generated by the SSB modulation transformation circuit 10G. The optical signal (optical SSB modulated signal) output from the optical transmitter section 1 is transmitted on the optical fiber transmission line 41 of the optical transmission section 4, and received by the optical receiver section 3.

The optical receiver section 3 according to this embodiment includes a waveform distortion compensation circuit 18 (correction circuit), the PD module 31, the AD converter 32, the equalization circuit 33, and the multi-level decoder 34. That is, the optical receiver section 3 according to this embodiment is obtained by adding the waveform distortion compensation circuit 18 arranged between the AD converter 32 and the equalization circuit 33 to the optical receiver section 3 according to the first embodiment. The optical receiver section 3 is configured to receive the optical modulated signal output by the optical transmitter section 1, and directly detect an intensity component of the optical modulated signal. The received optical modulated signal (SSB signal light) is converted into the analog electronic signal by the PD module 31, and then converted into the digital signal by the AD converter 32 to become a received power signal r. The received power signal r is input to the waveform distortion compensation circuit 18.

The waveform distortion compensation circuit 18 includes the waveform distortion correction circuit 19, the square rooting circuit 22, the Hilbert transformer 23, and a DC bias correction circuit 80. The waveform distortion compensation circuit 18 is configured to compensate the intensity of the received signal so that the intensity of the signal received through the direct detection becomes closer to the intensity of a double-side band (DSB) modulated signal. Specifically, a deviation in DC level caused between the PD module 31 and the AD converter 32 is compensated, and each signal level of the multi-level signal is corrected so as to have a positive value corresponding to the multi-level code in the optical intensity domain output by the multi-level coding circuit 21 of the optical transmitter section 1. The waveform distortion correction circuit 19 has the same configuration as that of the waveform distortion correction circuit 13 according to the second embodiment illustrated in FIG. 4 except that the input imaginary-part signal q is not divided into two signals, one of which is to be output as it is as the imaginary-part signal q'.

The output signal from the DC bias correction circuit 80 is divided into two signals, and one signal is input to the adder 61 of the waveform distortion correction circuit 19. The other signal passes through the square rooting circuit 22 and the Hilbert transformer 23, and is input to the negative constant weight squaring circuit 60 of the waveform distortion correction circuit 19. The adder 61 is configured to add the two input signals, and output the added input signals as a received power signal r'. In this case, a new received power signal r' output from the waveform distortion compensation circuit 18 can be expressed as $r' = r - C*H(\sqrt{r})^2$. The above-mentioned correction presupposes that an error between the received power signal r and an original multi-level intensity signal p at the transmitting end is small. Under this presupposition, the imaginary-part component being an intensity error of the SSB signal can be approximated by H(sqrt(r)), and hence the waveform distortion correction can be achieved in first-order approximation by the above-mentioned calculation.

In the first to sixth embodiments, the correction circuit is arranged in the optical transmitter section 1, but the present invention is not limited thereto, and the correction circuit may be arranged in the optical receiver section 3 as in this embodiment.

Eighth Embodiment

Figure 14:
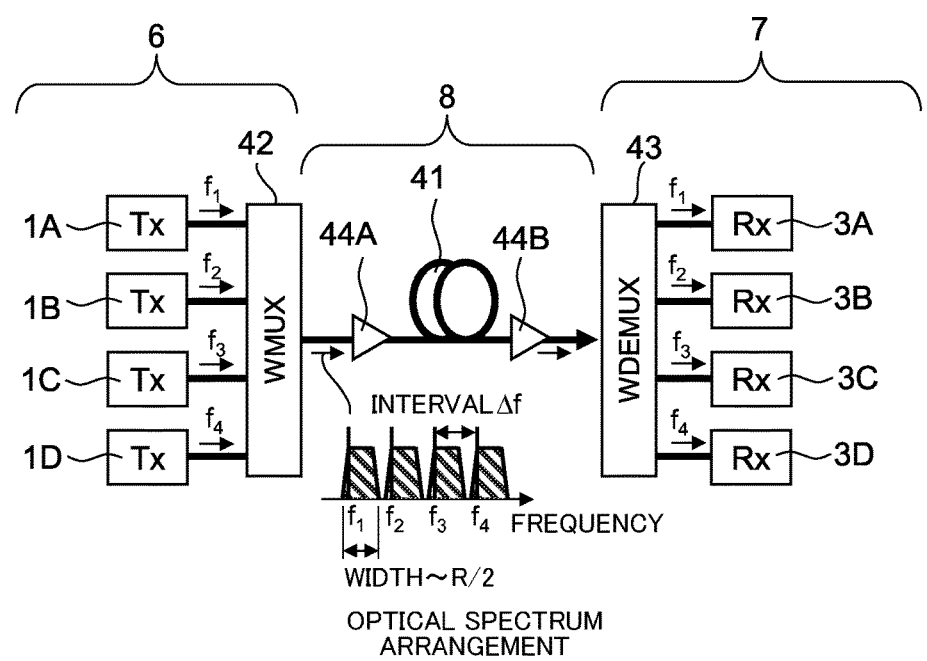
FIG. 14 is a schematic diagram for illustrating a configuration of an optical communication system according to an eighth embodiment of the present invention.

FIG. 14 is a schematic diagram for illustrating a configuration of an optical communication system according to an eighth embodiment of the present invention. The optical communication system according to this embodiment includes a wavelength multiplex optical transmitter section 6, a wavelength multiplex optical receiver section 7, and a wavelength multiplex optical transmission section 8, and is capable of transmitting a wavelength multiplex optical modulated signal.

The wavelength multiplex optical transmitter section 6 includes a plurality of optical transmitter sections 1 and an optical multiplexer 42. In this case, four optical transmitter sections 1A, 1B, 1C, and 1D are arranged in the wavelength multiplex optical transmitter section 6. The wavelength multiplex optical receiver section 7 includes a plurality of optical receiver sections 3 and an optical demultiplexer 43. In this case, four optical receiver sections 3A, 3B, 3C, and 3D are arranged in the wavelength multiplex optical receiver section 7. The wavelength multiplex optical transmission section 8 includes the optical fiber transmission line 41 and a plurality of optical amplifiers 44. In this case, two optical amplifiers 44A and 44B are arranged in the wavelength multiplex optical transmission section 8.

In this case, a pair of the optical transmitter section 1 and the optical receiver section 3 may be a pair of the optical transmitter section 1 and the optical receiver section 3 according to any one of the first to seventh embodiments. The following description is made by taking four pairs of the optical transmitter section 1 and the optical receiver section 3 according to the fourth embodiment as an example. As illustrated in FIG. 14, the four optical transmitter sections 1A, 1B, 1C, and 1D of the wavelength multiplex optical transmitter section 6 are configured to output optical modulated signals having mutually different four frequencies $f_1$, $f_2$, $f_3$, and $f_4$ (wavelengths of $\lambda_1$, $\lambda_2$, $\lambda_3$, and $\lambda_4$), respectively. The respective optical modulated signals output by the four optical transmitter sections 1A, 1B, 1C, and 1D are input to the optical multiplexer 42. The optical multiplexer 42 is configured to multiplex the four optical modulated signals, generate a wavelength multiplex optical modulated signal (high density wavelength multiplex light), and output the wavelength multiplex optical modulated signal. The wavelength multiplex optical modulated signal output from the wavelength multiplex optical transmitter section 6 is transmitted on the optical fiber transmission line 41 of the wavelength multiplex optical transmission section 8, and received by the wavelength multiplex optical receiver section 7. The two optical amplifiers 44A and 44B are arranged in the wavelength multiplex optical transmission section 8, and are configured to collectively amplify the wavelength multiplex optical modulated signal when the wavelength multiplex optical modulated signal is transmitted on the optical fiber transmission line 41.

The wavelength multiplex optical modulated signal received by the wavelength multiplex optical receiver section 7 is input to the optical demultiplexer 43, demultiplexed into four signals for the respective optical frequency components, and the four demultiplexed optical modulated signals are respectively input to the four optical receiver sections 3A, 3B, 3C, and 3D.

In this case, the optical modulated signal output by each of the optical transmitter sections 1 is an intensity modulated optical multi-level baseband Nyquist SSB signal (intensity modulated optical multi-level baseband Nyquist SSB light). The frequencies $f_1$, $f_2$, $f_3$, and $f_4$ of the optical modulated signal respectively output by the four optical transmitter sections 1 are aligned at regular intervals Δf as illustrated in FIG. 14, and the frequency bandwidth of each optical modulated signal can be reduced to substantially R/2. Therefore, the frequency interval Δf can be reduced to a value near R/2 within a range larger than R/2 and smaller than R, and the wavelength utilization efficiency and the transmission capacity are greatly improved by bringing the bands of the adjacent optical modulated signals close to each other. Thus, this embodiment produces a remarkable effect. By conducting the Nyquist modulation for an optical multi-level intensity modulated signal subjected to the SSB modulation, it is possible to set the frequency interval Δf smaller than a baud rate R.

The optical communication system according to this embodiment can be widely applied to the transmission of the wavelength multiplex optical modulated signal. For example, even in a so-called short distance optical fiber transmission, high cost is required for newly laying an optical fiber or renting an optical fiber line with a relatively long line having a fiber length of from several kilometers to several tens of kilometers, and hence there is sometimes a case where the wavelength multiplexing for transmitting a large number of optical signals through use of one optical fiber is suitable.

The optical communication system according to this embodiment relates to a point-to-point wavelength multiplex transmission system, but the wavelength multiplex transmission technology according to this embodiment is not limited thereto, and can be generally applied to an optical network with other network topologies such as ring, add/drop, and mesh.

The optical multiplexer 42 and the optical demultiplexer 43 according to this embodiment can be achieved by employing an arrayed waveguide (AWG), wavelength selective switching, an optical interleaver, or the like. When the optical transmitter section 1 according to the fourth embodiment is used, an optical SSB signal having a side-band suppression ratio of substantially equal to or larger than 17 dB is obtained, which suppresses a leakage from an adjacent channel at a time of the multiplexing. Therefore, it is desired that the AWG, the optical interleaver, and the like that can be achieved at a low cost be used as the optical multiplexer 42 and the optical demultiplexer 43, and it is possible to suppress the deterioration of the optical modulated signal.

As the optical amplifier 44 according to this embodiment, any optical amplifiers for wavelength multiplex signals that are widely used for optical fiber communications can be used without particular limitations. For example, an erbium-doped optical fiber amplifier, a semiconductor amplifier, a Raman amplifier, and the like can be used.

The optical communication systems and the optical transmitters according to the embodiments of the present invention have been described above. The present invention is not limited to the above-mentioned embodiments. In the above-mentioned embodiments, the baseband transmission is employed, but the present invention can be applied to another transmission system.

By further applying a polarization multiplexing technology to the optical communication systems according to the first to eighth embodiments, it is possible to improve the transmission capacity and frequency utilization efficiency twofold, to thereby produce a remarkable effect. A polarization multiplexer may be used at the transmitting end to multiplex each wavelength or collectively multiplex a plurality of wavelengths. Meanwhile, a related-art polarization demultiplexing technology can be used at the receiving end to divide the received signal into the original polarized components. For example, it is possible to use an automatic polarization control circuit, or to employ a combination of a Stokes optical receiver configured to directly receive three or four polarized components and a digital polarization demultiplexing technology for adaptively conducting polarization demultiplexing for the signal output from the Stokes optical receiver by digital signal processing, for example, a MIMO technology.

In order to further reduce an occupied wavelength band and further improve the frequency utilization efficiency, the receiver section may include a maximum-likelihood sequence estimation circuit configured to demodulate an optical modulated signal subjected to polybinary conversion. In order to conduct the polybinary conversion for the optical modulated signal, the optical transmitter section may include a polybinary conversion circuit, or an optical transmission section may include a narrow band filter, which enables further low band transmission.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An optical communication system, comprising:
   an optical transmitter section comprising:
   a single-side band modulation circuit configured to subject a double-side band modulated signal to transformation using single-side band modulation to generate a single-side band modulated signal; and
   an optical modulator configured to output an optical modulated signal based on the single-side band modulated signal generated by the single-side band modulation circuit; and
   an optical receiver section configured to receive the optical modulated signal output by the optical transmitter section, and to directly detect an intensity of the optical modulated signal to generate a received signal,
   wherein the optical receiver section comprises a compensation circuit configured to compensate an intensity of the received signal so that the intensity of the received signal becomes closer to an intensity of the double-side band modulated signal.

2. The optical communication system according to claim 1, further comprising:
   a plurality of the optical transmitter sections configured to output optical modulated signals having mutually different frequencies;
   an optical multiplexer configured to multiplex the optical modulated signals respectively output by the plurality of the optical transmitter sections to output a wavelength multiplex optical modulated signal;
   an optical demultiplexer configured to receive the wavelength multiplex optical modulated signal output by the optical multiplexer, and to demultiplex the wavelength multiplex optical modulated signal into a plurality of the optical modulated signals for the respective frequencies of the optical modulated signals respectively output by the plurality of the optical transmitter sections; and
   a plurality of the optical receiver sections configured to respectively receive input of the plurality of the optical modulated signals output by the optical demultiplexer.

3. The optical communication system according to claim 1, wherein the optical modulated signal comprises an optical signal subjected to optical multi-level baseband intensity modulation.

* * * * *